US012638697B2

(12) United States Patent
Gloege et al.

(10) Patent No.: US 12,638,697 B2
(45) Date of Patent: May 26, 2026

(54) SPECTACLE LENS AND METHOD FOR GENERATING DESIGN DATA FOR A SPECTACLE LENS

(71) Applicant: Carl Zeiss Vision International GmbH, Aalen (DE)

(72) Inventors: Thomas Gloege, Schorndorf (DE); Martin Reese, Aalen (DE)

(73) Assignee: Carl Zeiss Vision International GmbH, Aalen (DE)

( * ) Notice: Subject to any disclaimer, the term of this patent is extended or adjusted under 35 U.S.C. 154(b) by 0 days.

(21) Appl. No.: 19/233,817

(22) Filed: Jun. 10, 2025

(65) Prior Publication Data

US 2025/0306397 A1 Oct. 2, 2025

Related U.S. Application Data

(63) Continuation of application No. PCT/EP2023/085085, filed on Dec. 11, 2023.

(30) Foreign Application Priority Data

Dec. 22, 2022 (EP) ..................................... 22215983

(51) Int. Cl.
G02C 7/02 (2006.01)
B29D 11/00 (2006.01)
(52) U.S. Cl.
CPC ........ G02C 7/027 (2013.01); B29D 11/00355 (2013.01); *G02C 2202/16* (2013.01); *G02C 2202/24* (2013.01)
(58) Field of Classification Search
CPC ............ G02C 2202/12; G02C 2202/16; G02C 2202/24; G02C 7/027; G02C 7/028; G02C 7/024; G02C 7/022; B29D 11/00355

(Continued)

(56) References Cited

U.S. PATENT DOCUMENTS 4,640,587 A 2/1987 Henkel
4,856,889 A 8/1989 Guilino et al.
(Continued)

FOREIGN PATENT DOCUMENTS

DE 10 2014 000 107 A1 7/2015
EP 1 409 562 B1 4/2006
(Continued)

OTHER PUBLICATIONS

Trost et al., "Using drop-on-demand technology for manufacturing grin lenses," Proc. 2001 Ann Mtg. ASPE, pp. 533 to 536, 2001.
(Continued)

*Primary Examiner* — Travis S Fissel
(74) *Attorney, Agent, or Firm* — Qubit IP, PLLC

(57) ABSTRACT

A computer-implemented method generates design data for manufacturing a single vision spectacle lens having a prescribed power and an edge contour fitted to a predefined spectacle frame. Prescription information regarding the prescribed power for the spectacle lens and geometrical information regarding the predefined spectacle frame is provided. Moreover, a geometrical profile of at least one surface of the spectacle lens is optimized. Further, a spatial variation of a refractive index of the spectacle lens is optimized, wherein optimizing the geometrical profile of the surface of the spectacle lens and optimizing the spatial variation of the refractive index of the spectacle lens are carried out such that an optical power of the spectacle lens corresponds to the prescribed power and an edge thickness of an edge contour of the spectacle lens fitted to the geometrical information regarding the predefined spectacle frame varies by 0.5 mm or less over the edge contour.

17 Claims, 8 Drawing Sheets

(58) Field of Classification Search
USPC .................................................. 351/159.74
See application file for complete search history.

(56) References Cited

U.S. PATENT DOCUMENTS

| | | | |
|---|---|---|---|
| 5,033,838 A * | 7/1991 | Bonbon | G02C 7/02 |
| | | | 351/159.01 |
| 5,042,939 A | 8/1991 | Guilino et al. | |
| 6,176,577 B1 | 1/2001 | Monnoyeur et al. | |
| 6,569,373 B2 | 5/2003 | Napadensky | |
| 8,118,425 B2 | 2/2012 | Esser et al. | |
| 8,449,111 B2 | 5/2013 | Weatherby | |
| 10,976,573 B2 | 4/2021 | Spratt et al. | |
| 11,584,863 B2 | 2/2023 | Schwartz et al. | |
| 2005/0046957 A1 | 3/2005 | Lai et al. | |
| 2008/0123048 A1 * | 5/2008 | Volk | G02C 7/061 |
| | | | 351/159.42 |
| 2008/0231800 A1 * | 9/2008 | Esser | G02C 7/02 |
| | | | 351/159.67 |
| 2013/0107205 A1 | 5/2013 | Weatherby | |
| 2016/0306187 A1 | 10/2016 | Luderich et al. | |
| 2019/0250430 A1 * | 8/2019 | Mappes | B29D 11/00009 |
| 2019/0391411 A1 | 12/2019 | Kelch et al. | |
| 2020/0409174 A1 | 12/2020 | Taguchi et al. | |
| 2021/0117588 A1 | 4/2021 | Welscher | |
| 2021/0141244 A1 | 5/2021 | Kelch et al. | |
| 2021/0362444 A1 | 11/2021 | Totzeck et al. | |
| 2022/0134640 A1 | 5/2022 | Levy et al. | |

FOREIGN PATENT DOCUMENTS

| | | | |
|---|---|---|---|
| EP | 3 312 661 A1 | 4/2018 | |
| EP | 3 352 001 A1 | 7/2018 | |
| EP | 3 598 213 A1 | 1/2020 | |
| EP | 3 598 214 A1 | 1/2020 | |
| EP | 696 578 A1 | 8/2020 | |
| WO | 89/04986 A1 | 6/1989 | |
| WO | 2006/029268 A2 | 3/2006 | |
| WO | 2008/051592 A2 | 5/2008 | |
| WO | 2020/131786 A1 | 6/2020 | |
| WO | 2020/140248 A1 | 7/2020 | |
| WO | 2020/165439 A1 | 8/2020 | |
| WO | 2021/255337 A1 | 12/2021 | |
| WO | 2022/085006 A1 | 4/2022 | |

OTHER PUBLICATIONS

Fischer, "Gradient-Index Ophthalmic Lens Design and Polymer Material Studies," University of Rochester, 2002.
Industrial Norm "Ophthalmic optics—Uncut finished spectacle lenes—Part 2: Specifications for power-variation lenses (ISPO 8980-22017)" English version EN ISP 8980-22017, 2017.
Industrial Norm "Ophthalmic optics—Spectacle lenses—Vocabulary (ISO 13666:2019)," English version EN ISO 13666:2019, Dec. 2019.
Extended European Search Report issued in EP 22 215 983.2, to which this application claims priority, mailed on Jun. 9, 2023.
International Search Report and Written Opinion issued in PCT/EP2023/085085, to which this application claims priority, mailed on Mar. 25, 2024.
Written Opinion of the International Preliminary Examining Authority issued in PCT/EP2023/085085, to which this application claims priority, mailed on Dec. 4, 2024.
Written Opinion of the International Preliminary Examining Authority issued in PCT/EP2023/085085, to which this application claims priority, mailed on Mar. 14, 2025.
International Preliminary Report on Patentability issued in PCT/EP2023/085085, to which this application claims priority, mailed on May 9, 2025.
Office Action by the European Patent Office (EPO) issued in EP 23 821 620.4, which is a counterpart hereof, mailed on Oct. 15, 2025.
Office Action by the Chinese Patent Office (CIPO) issued in CN 202380087422.4, which is a counterpart hereof, mailed on Oct. 21, 2025, English-language translation attached.

* cited by examiner

FIG. 4A
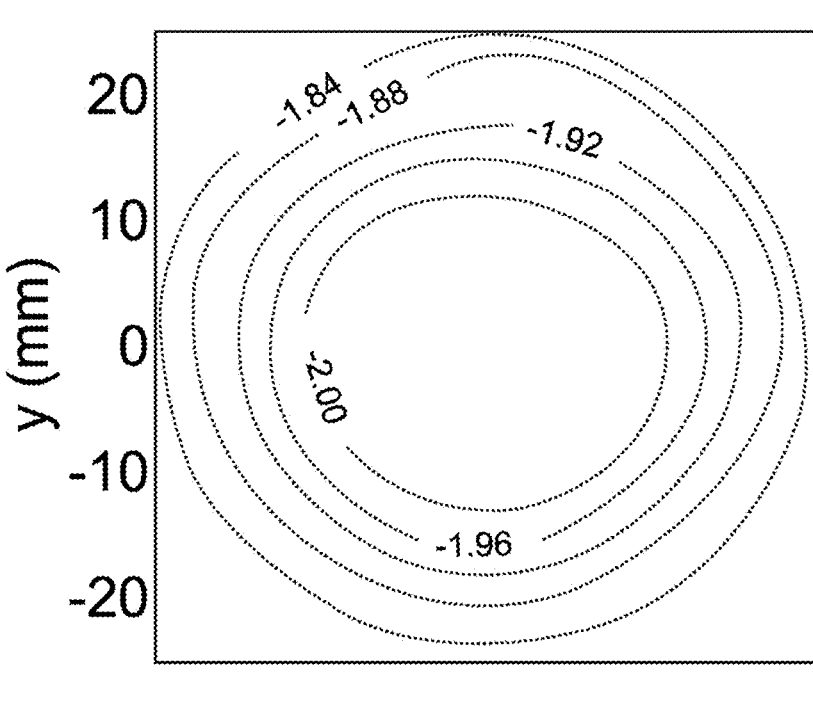
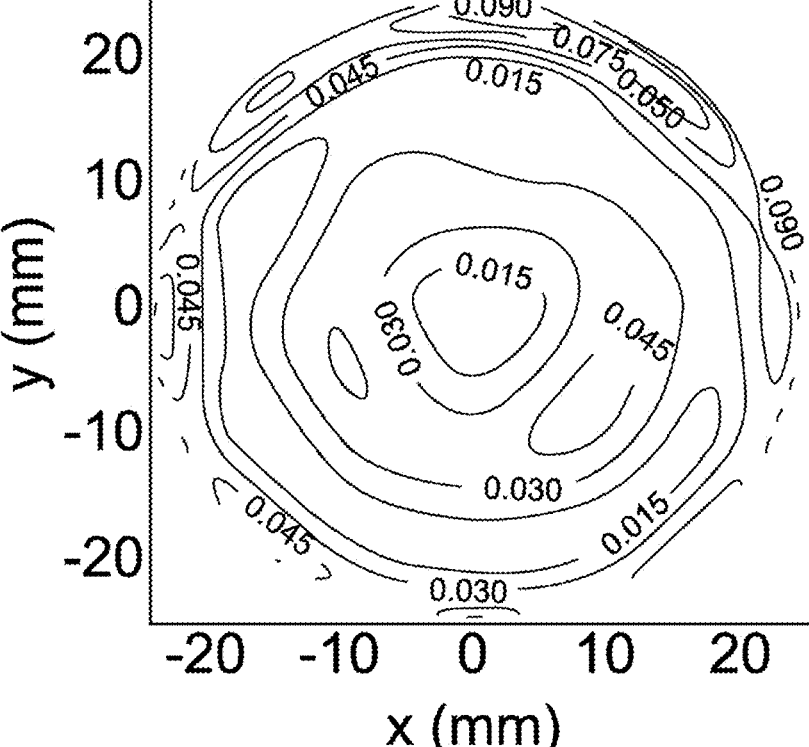
x (mm)
FIG. 4B

FIG. 5A
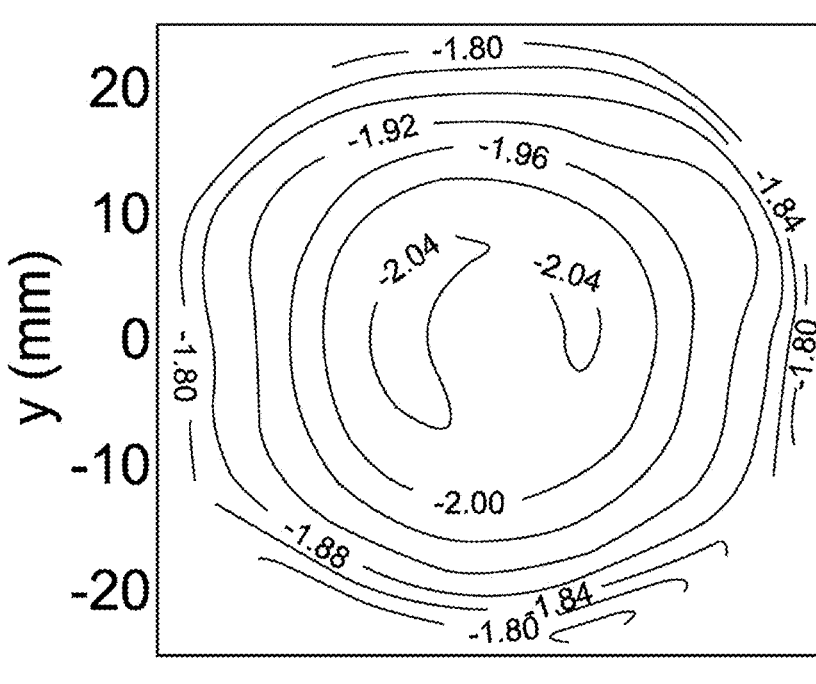
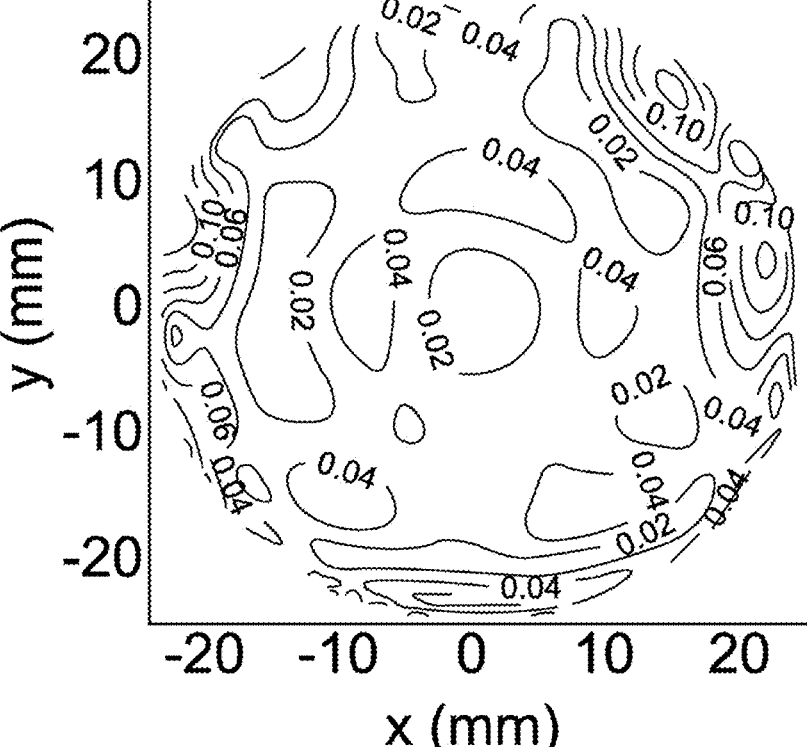
FIG. 5B

FIG. 5C
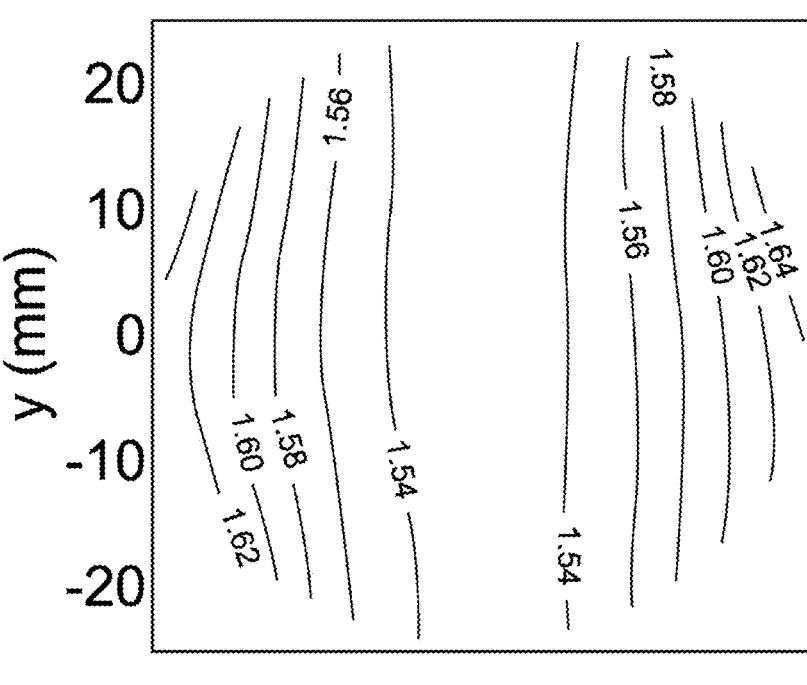
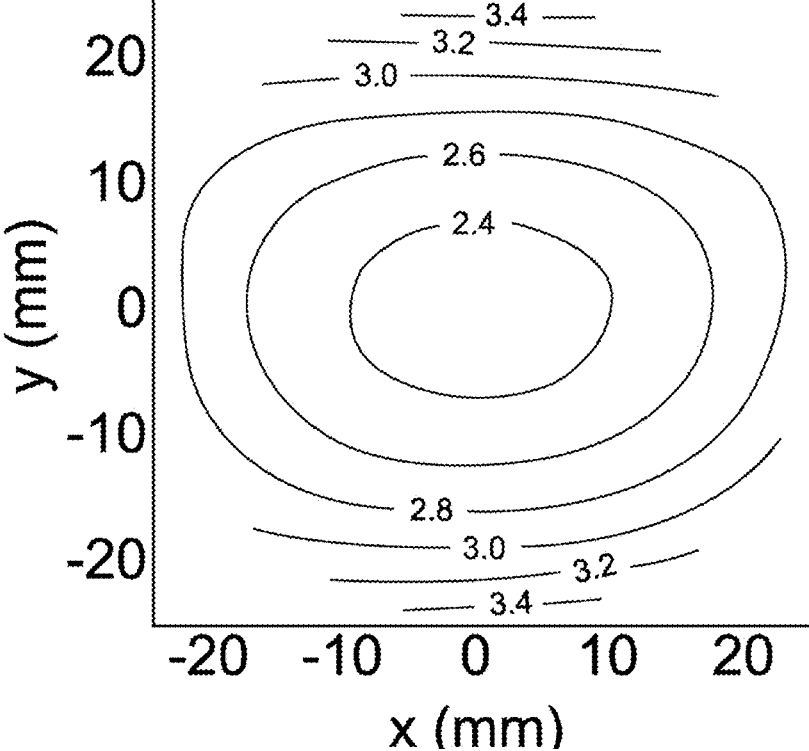
FIG. 5D

SPECTACLE LENS AND METHOD FOR GENERATING DESIGN DATA FOR A SPECTACLE LENS

CROSS REFERENCE TO RELATED APPLICATIONS

This application is a continuation application of international patent application PCT/EP2023/085085, filed on Dec. 11, 2023 and designating the U.S., which claims priority to European patent application 22 215 983.2, filed on Dec. 22, 2022, both of which are hereby incorporated by reference in their entireties.

TECHNICAL FIELD

Provided are a computer-implemented method for generating design data for a spectacle lens, a method for manufacturing a spectacle lens, a spectacle lens, a data set, a computer program comprising instructions which, when the program is executed by a computer, cause the computer to carry out a method according to the disclosure, a computer-readable storage medium having stored thereon a computer program according to the disclosure, a data signal carrying the computer program according to the disclosure, and a data processing system comprising a processor configured to generate a design for a spectacle lens. The exemplary embodiments are, thus, related to designs for spectacle lenses.

BACKGROUND

US 2013/107205 A1 describes a method for manufacturing a prescription lens that includes obtaining information of a prescription lens and a frame to accommodate the prescription lens, calculating the maximum lens thickness of the prescription lens at the optical zone according to the information of the prescription lens, selecting a lens according to the calculated maximum lens thickness at the optical zone, the information of the prescription lens and the frame, and processing the selected lens so as to obtain the prescription lens having an intermediate zone surrounding the optical zone and an edge zone surrounding the intermediate zone such that the thickness of the edge zone is substantially thinner than the maximum lens thickness of the optical zone.

WO 89/04986 A1 describes a progressive ophthalmic lens comprising a distance portion, the refractive power of which being designed for distance vision, a reading portion, the refractive power of which being designed for near vision, and an intermediate portion, in which the refractive power along the main line of vision at least partially increases continuously from the refractive power of the distance portion to the reading portion. A refractive index of the lens material varies along the main line of vision at least in the intermediate portion so as to at least partially contribute to the increase in refractive power.

US 2008/231800 A1 describes a spectacle lens with an object-sided front face and an eye-sided rear face, wherein the rear face comprises a viewing region that contributes to the optical effect of the spectacle lens and a carrier rim region that at least partially surrounds the viewing region and that does not significantly contribute to the optical effect of the spectacle lens. The rear face of the spectacle lens in the carrier rim zone is constructed substantially from a cosmetic viewpoint without consideration of the optical image-forming properties WO 2006/029268 A2 describes a system for making an optical element, comprising a substrate, a spray unit charged with at least a first polymer composition and a second polymer composition, the spray unit being capable of projecting the first composition and the second composition onto a plurality of pre-selected locations on the substrate, in a plurality of pre-selected ratios of the first polymer composition to the second polymer composition, and a control unit operatively connected to the spray unit.

U.S. Pat. No. 4,856,889 A describes a uniform ophthalmic lens having a gradient refractive index changing rotational-symmetrically about the optical axis.

Spectacle lenses made of a homogeneous material with spherical or aspherical design conventionally do not offer any possibility to keep the edge thickness constant after edging the spectacle lens to the edge contour fitting the predefined spectacle frame. Instead, the edge thickness of the spectacle lenses usually depends on a distance of the spectacle frame from a centering point of the spectacle lens. Spectacle lenses having in addition to a spherical power a cylindrical power and/or a variation of the thickness of the spectacle lens, may exhibit an even larger variation of the edge thickness after edging the spectacle lens.

In prior art, spectacle lenses having a homogeneous edge thickness have been realized by means of lenticular lenses. With lenticular lenses, the edge of the optical area is shifted inward from the edge of the spectacle lens, enabling a homogeneous edge thickness but reducing the usable optical area of the spectacle lens. The homogeneous edge is formed by a supporting rim having a homogeneous thickness but having no optical effect, which merely serves holding the spectacle lens in the spectacle frame. The supporting rim may be designed with a constant material thickness.

Lens blanks for spectacle lenses prior to edging may be made as thin as possible, for example, by using aspherical front surface designs being constant around the lens (as described for instance in U.S. Pat. No. 6,176,577 B1). However, edging the spectacle lens conventionally results in the edge contour having an inhomogeneous thickness unless the predefined spectacle frame is exactly rotationally symmetric around the visual point of the spectacle frame, which is very unusual.

In the field of progressive lenses, so-called prism thinning (3.16.9 in ISO 13666:2019(EN)) may be introduced which may reduce a variation of the edge thickness of the spectacle lens, but which still result in visible inhomogeneities of the edge thicknesses.

In the case of conventional spectacle lenses, providing a carrier curve may influence the edge thickness, which, however, alters the optical power of the spectacle lens and consequently may lead to a deviation of the optical power of the spectacle lens from the prescribed power. Accordingly, vision may become blurred through the influenced areas of the spectacle lens (see U.S. Pat. Nos. 4,640,587 A, 8,118,425 B2, and 8,449,111 B2).

To some degree, differences in the optical power between the spectacle lenses for the right and left eye can be considered when designing the spectacle lenses and thus, within narrow limits, a reduction of the inhomogeneity of the edge thicknesses between the two lenses may be achieved, as described in U.S. Pat. No. 10,976,573 B2.

Moreover, conventional systems for designing a spectacle lens may include considerations regarding a minimum edge thickness of the spectacle lens to be designed. US 2020/0409174 A1 describes a spectacle lens design system including an information acquisition device. This device includes a first design data deriving device deriving first design data of an eyeball-side surface and a first thickness information deriving device deriving first values of wall thickness and edge thickness of the spectacle lens. Moreover, the device comprises a second design data deriving device deriving second design data of the eyeball-side surface, which has higher accuracy than the first design data, based on the prescription value of the wearer and the design data of the object-side surface; and a second thickness information deriving device deriving second values of the wall thickness and edge thickness of the spectacle lens based on the derived second design data of the eyeball-side surface, the design data of the object-side surface, and the minimum wall thickness and minimum edge thickness information of the spectacle lens. Therefore, US 2020/0409174 A1 is related to the technical field of generating design data for spectacle lenses.

The subject-matter presently claimed herein relates to a computer-implemented method for generating design data for a spectacle lens suitable for the purpose of a use of the design data for manufacturing the spectacle lens having a prescribed power and an edge contour fitted to an intended predefined spectacle frame. Hence, the claimed subject-matter is related to the technical field of generating design data for spectacle lenses.

The subject-matter of claim 1 delimits against US 2020/0409174 A1 at least in the distinguishing feature, according to which the computer-implemented method for generating design data for a spectacle lens comprises optimizing a spatial variation of a refractive index of the spectacle lens, wherein the optimizing the geometrical profile of at least one surface of the spectacle lens and the optimizing the spatial variation of the refractive index of the spectacle lens are carried out such that an optical power of the spectacle lens corresponds to the prescribed power and an edge thickness of an edge contour of the spectacle lens fitted to the geometrical information regarding the predefined spectacle frame varies by 0.5 mm or less over the edge contour.

Since US 2020/0409174 A1 relates to the same technical field as the subject-matter of claim 1 and the subject-matter of claim 1 delimits against claim 1 in the least number of distinguishing features as compared to the other cited prior art documents, US 2020/0409174 A1 is considered as closest prior art.

In view of US 2020/0409174 A1 as closest prior art, the objective technical problem relates to providing design data for spectacle lenses allowing for a larger number of degrees of freedom of the design data regarding the edge thickness of the spectacle lens according to the generated design data.

The claimed subject-matter delimiting at least by the above-cited distinguishing feature of claim 1 against US 2020/0409174 A1 is not obvious in view of the prior art.

When starting from US 2020/0409174 A1 as closest prior art, a skilled person trying to solve the above-mentioned objective technical problem would generate the design data such that the spectacle lens comprises a supporting rim having a thickness being larger than the predefined minimum edge thickness but having no optical effect. This would decouple the desired minimum edge thickness from the optical effect of the spectacle lens and, hence, increase the freedom for designing spectacle lenses having a minimum edge thickness and predefined optical properties. For doing so, a skilled person would consider the teaching of U.S. Pat. No. 6,176,577 B1 (see abstract), which would teach the skilled person to provide the design data for the spectacle lens such that the spectacle lens comprises an optically active region having a diameter smaller than the diameter of the spectacle lens and a border region matched to the optically active region having a desired minimum edge thickness.

SUMMARY

This approach solves the objective technical problem, but does not render the subject-matter of claim 1 obvious.

According to the claimed subject-matter, the objective technical problem is solved by a computer-implemented method for generating design data for a spectacle lens, a method for manufacturing a spectacle lens, a spectacle lens, a data set, a computer program comprising instructions which, when the program is executed by a computer, cause the computer to carry out a method according to the disclosure, a computer-readable storage medium having stored thereon a computer program according to the disclosure, a data signal carrying the computer program according to the disclosure, and a data processing system comprising a processor configured to generate a design for a spectacle lens having the features of the respective independent claim. Exemplary embodiments are provided in the dependent claims and the description.

In one aspect, a computer-implemented method for generating design data for a spectacle lens suitable for the purpose of a use of the design data for manufacturing the spectacle lens having a prescribed power and an edge contour fitted to a predefined spectacle frame is provided. The method comprises providing prescription information regarding the prescribed power for the spectacle lens and geometrical information regarding the predefined spectacle frame. Moreover, the method comprises optimizing a geometrical profile of at least one surface of the spectacle lens. The method further comprises optimizing a spatial variation of a refractive index of the spectacle lens. Optimizing the geometrical profile of at least one surface of the spectacle lens and optimizing the spatial variation of the refractive index of the spectacle lens are carried out such that an optical power of the spectacle lens corresponds to the prescribed power and an edge thickness of an edge contour of the spectacle lens fitted to the geometrical information regarding the predefined spectacle frame varies by 0.5 mm or less over the edge contour.

In another aspect, a computer-implemented method for generating design data for a single vision spectacle lens suitable for the purpose of a use of the design data for manufacturing the spectacle lens having a prescribed power and an edge contour fitted to a predefined spectacle frame is provided. The method comprises providing prescription information regarding the prescribed power for the spectacle lens and geometrical information regarding the predefined spectacle frame. Moreover, the method comprises optimizing a geometrical profile of at least one surface of the spectacle lens. The method is characterized in that the method further comprises optimizing a spatial variation of a refractive index of the spectacle lens. The optimizing the geometrical profile of at least one surface of the spectacle lens and the optimizing the spatial variation of the refractive index of the spectacle lens are carried out such that an optical power of the spectacle lens corresponds to the prescribed power and an edge thickness of an edge contour of the spectacle lens fitted to the geometrical information regarding the predefined spectacle frame varies by 0.5 mm or less over the edge contour.

In yet another aspect, a computer-implemented method for generating design data for a single vision spectacle lens suitable for the purpose of a use of the design data for manufacturing the spectacle lens having a prescribed power and an edge contour fitted to a predefined spectacle frame is provided. The method comprises providing prescription information regarding the prescribed power for the spectacle lens and geometrical information regarding the predefined spectacle frame. Moreover, the method comprises optimizing a geometrical profile of at least one surface of the spectacle lens. The method is characterized in that the method further comprises optimizing a spatial variation of a refractive index of the spectacle lens. Optimizing the geometrical profile of at least one surface of the spectacle lens and optimizing the spatial variation of the refractive index of the spectacle lens are carried out such that an optical power of the spectacle lens corresponds to the prescribed power and an edge thickness of an edge contour of the spectacle lens fitted to the geometrical information regarding the predefined spectacle frame varies by 0.5 mm or less over the edge contour and such that the spatial variation of the refractive index of the spectacle lens can be realized by applying two or more different materials in a spatially selective manner by using at least partly an additive manufacturing technique.

In yet another aspect, a method for manufacturing a spectacle lens is provided. The method comprises providing a design for the spectacle lens generated according to a method according to the disclosure and manufacturing the spectacle lens according to the generated design data.

In yet another aspect, a method for manufacturing a spectacle lens is provided. The method comprises providing a design for the spectacle lens generated according to a method according to the disclosure and manufacturing the spectacle lens according to the generated design data, wherein manufacturing the spectacle lens is carried out at least partly using an additive manufacturing technique.

In yet another aspect, a spectacle lens having a prescribed power and an edge contour fitted to a predefined spectacle frame is provided. The spectacle lens has a locally varying refractive index and a geometrical profile of at least one surface of the spectacle lens resulting in a power of the spectacle lens essentially corresponding to the prescribed power and an edge thickness varying by not more than 0.5 mm over the edge contour.

In yet another aspect, a spectacle lens having a prescribed power and an edge contour fitted to a predefined spectacle frame is provided. The spectacle lens is a single vision lens and has a locally varying refractive index and a geometrical profile of at least one surface of the spectacle lens resulting in a power of the spectacle lens essentially corresponding to the prescribed power and an edge thickness varying by not more than 0.5 mm over the edge contour.

In yet another aspect, a data set in the form of a computer-readable data signal is provided. The data set comprises at least one of a numerical representation of the spectacle lens according to the disclosure configured to be fed to one or more manufacturing machines for manufacturing the spectacle lens, and data containing computer-readable instructions for controlling one or more manufacturing machines to manufacture the spectacle lens according to the disclosure.

In yet another aspect, a computer program is provided, the computer program comprising instructions which, when the program is executed by a computer, cause the computer to carry out a method for generating design data for a spectacle lens according to the disclosure.

In yet another aspect, a computer program is provided, the computer program comprising instructions which, when the program is executed by a computer of one or more manufacturing machines, cause the computer to carry out a method for manufacturing a spectacle lens according to the disclosure.

In yet another exemplary embodiment, a computer-readable storage medium having stored thereon a computer program according to the disclosure is provided.

In yet another aspect, a data signal carrying the computer program according to the disclosure is provided.

In yet another exemplary embodiment, a data processing system is provided. The data processing system comprises a processor configured to generate design data suitable for the purpose of a use of the design data for manufacturing the spectacle lens having a prescribed power and an edge contour fitted to a predefined spectacle frame. Generating the design data comprises providing prescription information regarding the prescribed power for the spectacle lens and geometrical information regarding the predefined spectacle frame. Moreover, generating the design data comprises optimizing a geometrical profile of at least one surface of the spectacle lens. The data processing system is characterized in that characterized in that generating the design data further comprises optimizing a spatial variation of a refractive index of the spectacle lens. Optimizing the geometrical profile of at least one surface of the spectacle lens and optimizing the spatial variation of the refractive index of the spectacle lens are carried out such that an optical power of the spectacle lens corresponds to the prescribed power and an edge thickness of an edge contour of the spectacle lens fitted to the geometrical information regarding the predefined spectacle frame varies by 0.5 mm or less over the edge contour.

In yet another exemplary embodiment, a data processing system is provided. The data processing system comprises a processor configured to generate design data of a single vision spectacle lens suitable for the purpose of a use of the design data for manufacturing the spectacle lens having a prescribed power and an edge contour fitted to a predefined spectacle frame. Generating the design data comprises providing prescription information regarding the prescribed power for the spectacle lens and geometrical information regarding the predefined spectacle frame. Moreover, generating the design data comprises optimizing a geometrical profile of at least one surface of the spectacle lens. The data processing system is characterized in that characterized in that generating the design data further comprises optimizing a spatial variation of a refractive index of the spectacle lens. Optimizing the geometrical profile of at least one surface of the spectacle lens and optimizing the spatial variation of the refractive index of the spectacle lens are carried out such that an optical power of the spectacle lens corresponds to the prescribed power and an edge thickness of an edge contour of the spectacle lens fitted to the geometrical information regarding the predefined spectacle frame varies by 0.5 mm or less over the edge contour.

In yet another exemplary embodiment, a data processing system is provided. The data processing system comprises a processor configured to generate design data of a single vision spectacle lens suitable for the purpose of a use of the design data for manufacturing the spectacle lens having a prescribed power and an edge contour fitted to a predefined spectacle frame. Generating the design data comprises providing prescription information regarding the prescribed power for the spectacle lens and geometrical information regarding the predefined spectacle frame. Moreover, generating the design data comprises optimizing a geometrical profile of at least one surface of the spectacle lens. The data processing system is characterized in that characterized in that generating the design data further comprises optimizing a spatial variation of a refractive index of the spectacle lens. The optimizing the geometrical profile of at least one surface of the spectacle lens and the optimizing the spatial variation of the refractive index of the spectacle lens are carried out such that an optical power of the spectacle lens corresponds to the prescribed power and an edge thickness of an edge contour of the spectacle lens fitted to the geometrical information regarding the predefined spectacle frame varies by 0.5 mm or less over the edge contour and such that the spatial variation of the refractive index of the spectacle lens can be realized by applying two or more different materials in a spatially selective manner by using at least partly an additive manufacturing technique.

Furthermore, a data set in the form of a computer-readable data signal comprising at least one kind of the following kinds of data is provided: (i) a virtual representation of the spectacle lens configured for the purpose of use for manufacturing the spectacle lens according to any one of the preceding claims; and (ii) data containing computer-readable instructions for controlling one or more manufacturing machines to manufacture the spectacle lens according to any one of the preceding claims.

In addition, a computer readable storage medium having stored thereon a data set according to the disclosure is provided.

Moreover, a method being configured for generating by computer means a spectacle lens design data for a spectacle lens is provided, such that the spectacle lens comprises a clear region arranged in the center of the spectacle lens having a focal power adjusted to provide emmetropia, and a ring-shaped diffractive power region having a diffractive add power providing a focal power deviating from the focal power of the central region, characterized in further comprising a refractive power region arranged radially outside of the diffractive power region having a refractive power providing a focal power deviating from the focal power of the clear region.

Additionally or alternatively, a data processing device comprising a processor configured to perform the above described method at least partly may be provided.

In other words, a data processing system comprising a processor and a storage medium coupled to the processor may be provided, wherein the processor is adapted to perform the above described method at least partly based on a computer program stored on the storage medium.

The data processing device or system may be a digital electronic machine that can be programmed to carry out sequences of arithmetic or logical operations (computation) automatically. These logical operations may be defined by the above-described method at least partly.

The data processing device may be a computer. The term computer may refer to general-purpose devices like personal computers (PC) and mobile devices like smartphones and tablets. However, the term computer is not limited to a single device. Instead, the term computer should be interpreted in a broad manner including all data processing devices configured to or being suitable to carry out the above described method, alone or in combination with other (data processing) devices, at least partly. Therefore, the term computer may also refer to a group of computers that are linked and function together, such as a computer network or computer cluster.

The data processing device may comprise at least one processor or processing element, e.g., a central processing unit (CPU) (optionally in the form of a microprocessor). The data processing device may comprise a computer memory, optionally a semiconductor memory chips. The processor may be configured to carry out a computer program. The computer program may be stored on the computer memory. The data processing device may include may be configured to be connect to one or more peripheral devices, e.g., including at least one of an input device (e.g., a keyboard, a mouse, a joystick, etc.), an output device (a monitor screen, a printer, etc.), and input/output devices that perform both functions (e.g., a touchscreen). The peripheral device may allow information to be retrieved from an external source, such as an operator of the computer, and they enable the result of operations to be saved and retrieved.

The above given description with respect to the method applies mutatis mutandis to the data processing device and vice versa.

Additionally or alternatively, a computer program comprising instructions which, when the program is executed by a computer, cause the computer to carry out the above described method at least partly may be provided.

A computer program may be defined—inter alia—as a sequence or set of instructions in a programming language for a computer to execute. The computer program may be considered a software component.

The computer program may be provided—inter alia—as an executable file and may be provided in the form of source code, i.e., its human-readable form. Source code may need an additional computer program to be executable by a computer because computers regularly can only execute their native machine instructions. Thus, also this additional computer program may be provided or may be part of the computer program. However, the computer program may also be provided without such an additional computer program.

The above given description with respect to the method and the data processing device applies mutatis mutandis to the computer program and vice versa.

Additionally or alternatively, a computer-readable storage medium having stored the above described computer program at least partly thereon may be provided.

That is, the computer-readable storage medium may comprise instructions which, when the instructions are executed by a computer, cause the computer to at least partially execute the method described above.

The computer-readable storage medium may be any digital data storage device, such as a USB flash drive, a hard drive, a CD-ROM, an SD card, or an SSD card.

The above given description with respect to the method, the data processing device and the computer program applies mutatis mutandis to the computer-readable storage medium and vice versa.

Additionally or alternatively, a data signal carrying the above described computer program at least partly thereon may be provided.

That is, the computer program does not necessarily have to be stored on a computer-readable storage medium in order to be made available to the computer, but can also be obtained externally via the data signal, e.g., using the Internet or otherwise.

The method being computer-implemented means that some or all of the method steps may be carried out by a computer and/or using a computer.

Design data for a spectacle lens may be any kind of information which enables the manufacturing for a spectacle lens having the specifications as provided by the design data. In particular, the design data may include information regarding a geometrical shape of the front surface, a back surface and an edge contour. Moreover, the design data may include information regarding one or more materials, of which the spectacle lens may consist or which the spectacle lens may comprise. Moreover, the design data may include information regarding various parameters specifying the spectacle lens, such as a refractive index, a spatial variation of the refractive index in the spectacle lens, centration information, such as centration points, vision points, position and appearance of optical marks and any other characteristics beneficial for manufacturing the spectacle lens.

A spectacle lens may satisfy the specifications of section 3.5.2 of ISO 13666:2019(E)). In particular, a spectacle lens may be an ophthalmic lens according to section 3.5.1 of ISO 13666:2019(E) worn in front of, but not in contact with, the eyeball.

As generally used within the meaning of section 3.2.30 of ISO 13666:2019(E), a centration point may be a point with respect to the frame at which with respect to the frame at which the optical center (section 3.2.15 of ISO 13666:2019 (E)), distance reference point (section 3.2.20 of ISO 13666:2019(E)) or fitting point (section 3.2.34 of ISO 13666:2019 (E)) is to be located in the absence of any ordered prismatic effect (section 3.11.14 of ISO 13666:2019(E)) and any prism thinning (section 3.16.9 of ISO 13666:2019(E)), or after any such prismatic effect (section 3.11.9 of ISO 13666:2019(E)) has been neutralized. Which of these is relevant depends upon the type of lens (section 3.5.2 of ISO 13666:2019(E)), for example, the optical center (section 3.2.15 of ISO 13666:2019(E)) usually applies to a single-vision lens (section 3.7.1 of ISO 13666:2019(E)), distance reference point (section 3.2.20 of ISO 13666:2019(E)) usually to an aspheric lens (section 3.6.8 of ISO 13666:2019(E)) or multifocal lens (section 3.7.3 of ISO 13666:2019(E)) and fitting point (section 3.2.34 of ISO 13666:2019(E)) usually to a position-specific single-vision lens (section 3.7.2 of ISO 13666:2019(E)) or a power-variation lens (section 3.7.7 of ISO 13666:2019(E)). When a lens incorporates prismatic power (3.11.10), a correction may be made to the position of the centration point (monocular centration distance (section 3.2.31 of ISO 13666:2019(E)) and centration point height) when mounting the lens to compensate for the change in position of the eye. This correction may depend on the power of the prismatic correction needed and the as-worn position (section 3.2.36 of ISO 13666:2019(E)). This correction may be done when ordering the lenses or be done by the manufacturer.

The prescribed power may be an optical power prescribed to the patient, which represents a target value or more target values for the optical power of the spectacle lens to be designed and produced. The prescribed power may be a specified dioptric power for correcting the vision of a wearer of the spectacles as a result of a measured refraction (as defined in 3.10.13 of ISO 13666:2019(E)). The optical power may correspond to a focal power according to section 3.10.2 of ISO 13666:2019(E), which may comprise the spherical and astigmatic vertex powers (according to section 3.10.7 of ISO 13666:2019(E)) of a spectacle lens according to section 3.5.2 of ISO 13666:2019(E)). The prescribed power may be the vertex power corresponding the reciprocal of the paraxial vertex focal length measured in meters according to section 3.10.7 of ISO 13666:2019(E)).

The optical power may be a property of the design data. A spectacle lens manufactured according to the design data may exhibit a resulting optical power. The resulting optical power of the manufactured spectacle lens may correspond to the optical power of the design data within predetermined manufacturing tolerances.

The resulting optical power of the spectacle lens may correspond to an optical power of a spectacle lens manufactured according to the design data. Alternatively or additionally, the resulting optical power of the spectacle lens may correspond to an optical power subjectively experienced by a wearer when wearing the spectacle lens for correcting the wearer's vision. Alternatively or additionally, the resulting optical power of a spectacle lens may correspond to an optical power of a spectacle lens manufactured according to the design data which may be objectively measurable Alternatively or additionally, the resulting optical power of a spectacle lens may correspond to the ability of a spectacle lens to alter the curvature or direction of an incident wave front by refraction, as specified in section 3.1.10 of ISO 13666:2019(E)).

The terms "power" and "optical power" may be used as synonyms throughout the disclosure.

As generally used, the term "focal power" is a collective term for the spherical vertex power, which brings a paraxial pencil of parallel light to a single focus and which is usually considered in the prescription by the "sphere" value or, abbreviated, "sph," and the cylindrical vertex power of a spectacle lens, which brings a paraxial pencil of parallel light to two separate line foci mutually at right angles (section 3.10.2 of ISO 13666:2019(E)) and which is usually considered in the prescription by the "cylinder" value or, abbreviated, "cyl." The "vertex power" is the reciprocal of the paraxial vertex focal length (section 3.10.7 of DIN EN ISO 13666:2019(E)).

It may be intended to design and manufacture the spectacle lens such that a deviation of the optical power of the manufactured spectacle lens from the prescribed power is zero or as small as possible. The power of the spectacle lens corresponding to the prescribed power means that a deviation of the power of the spectacle lens from the prescribed power is not more than a maximum allowed deviation according to DIN EN ISO 8980-1 and 2. The maximum allowed deviation may be not more than ±0.2 D.

Generating the design data for a spectacle lens may include a consideration of an "as worn" position, i.e., a position of wear, of the spectacle lens as defined in section 3.2.36 of ISO 13666:2019(E) and/or a distance between the cornea of the wearer's eye and the spectacle lens. The as-worn position shall be measured with the habitual head and body posture. For distance vision, this may usually be measured in the primary position according to section 3.2.26 of ISO 13666:2019(E) when looking straight ahead in unaided vision.

The decentration of the spectacle lens may relate to a displacement of the centration point (according to section 3.2.30 of ISO 13666:2019(E)) from a boxed center (according to section 3.2.5 of ISO 13666:2019(E)) of the shape of the edged lens (according to section 3.8.9 of ISO 13666:2019(E)).

The edge contour may relate to an outer boundary of the spectacle lens perpendicular to its optical axis. The edge contour may be comparable to the final size and shape of an edged lens according to section 3.8.9 of ISO 13666:2019(E). However, the spectacle lens according to the disclosure may be manufactured using an additive manufacturing method instead of edging a semi-finished spectacle lens product or a finished spectacle lens product or an uncut lens according to (section 3.8.8 of ISO 13666:2019(E)).

The geometrical information regarding the predefined spectacle frame may be such information enabling a manufacturing or adaptation of the spectacle lens to fit into the predefined spectacle frame. In particular, the geometrical information regarding the predefined spectacle frame may include one or more contours of the spectacle frames for receiving a spectacle lens. Moreover, the geometrical information may include information regarding a groove provided in the spectacle frame for fixating a spectacle lens in the spectacle frame. In addition, the geometrical information regarding the predefined spectacle frame may include centration information enabling a centered arrangement of the spectacle lens in the predefined spectacle frame.

The edge thickness of the spectacle lens is a thickness of the spectacle lens at the edge of the spectacle lens. The thickness may correspond to a spatial extension in a direction parallel to an optical axis of the spectacle lens. The edge thickness may correspond to a distance between a front surface and a back surface of the spectacle lens at the edge of the spectacle lens. The edge may be the surface surrounding the spectacle lens and adjoining the outer rims of the front surface and the back surface of the spectacle lens. The edge thickness may be determined at the outer rims of the front surface and the back surface of the spectacle lens and may correspond to their distance from each other in a dimension parallel to the optical axis of the spectacle lens. However, the edge thickness may not be determined solely by an optional bevel arranged at the edge contour of the spectacle lens provided for engaging a groove possibly provided in the predefined spectacle frame for fixating the spectacle lens. The edge thickness of the edge contour of the spectacle lens varying by 0.5 mm or less results in the edge contour having an essentially homogeneous edge thickness. Optionally the edge thickness may vary by 0.2 mm or less and optionally even 0.1 mm or less around the edge contour. However, for some optional designs of spectacle lenses having a large cylindric power and/or for multifocal lenses the variation of the edge thickness may be 20% or less. The variation of the edge thickness may be determined as the variance of the edge thickness with respect to the thickest value of the edge thickness of the spectacle lens. The edge contour may exhibit a chamfer in order to avoid sharp edges at the edge contour of the spectacle lens. In this case the edge thickness may be determined at the thicker edge of the chamfer. The chamfer may comprise a slanted surface which extends at an angle of about 45° with respect to the edge surface and/or with respect to the front surface and/or back surface of the spectacle lens at the intersection with the chamfer. A spectacle lens manufactured according to generated design data may have a homogeneous edge thickness as specified in the design data, i.e., having an edge thickness varying 0.5 mm or less over the edge contour. However, optionally a spectacle lens manufactured according to generated design data may have a slightly larger variation of the edge thickness than the design data on which the spectacle lens is based. For instance, the edge thickness of the resulting manufactured spectacle lens may optionally be up to 12% or 15% of the variation of the edge thickness in the design data is specified as 10% or less. The edge contour may correspond to a shape of the spectacle lens being defined by the inner shape of the predefined spectacle frame.

A spatial variation of the refractive index of the spectacle lens means that the spectacle lens does not have a homogeneous spatial index throughout the entire spectacle lens. Instead, the refractive index of the material of the spectacle lens varies in different portions of the spectacle lens. For this purpose, the spectacle lens may be manufactured of different materials, such as a mixture of different materials differing in their respective refractive index. The different portions of the spectacle lens having different refractive indices may be located in different positions in a direction perpendicular to the optical axis of the spectacle lens. The respective refractive index of a portion of the spectacle lens may be an effective refractive index present in the volume of the spectacle lens at the respective position of the respective portion of the spectacle lens. In other words, should different materials having different indices of refraction be arranged in an overlapping manner behind each other in a direction parallel to the optical axis of the spectacle lens, the portion may be considered as having an effective refractive index which may correspond to the average refractive index of the overlapping materials along the direction parallel to the optical axis of the spectacle lens. Hence, for the spatial variation of the refractive index a variation only in directions perpendicular to the optical axis of the spectacle lens may be considered. The spatial variation of the refractive index may correspond at least partly to a continuous distribution of the refractive index. In other words, the spatial variation of the refractive index may be such that there are no steps or jumps in the refractive index throughout the spectacle lens. In particular, the spatial variation of the refractive index may result in one or more gradients of the refractive index across the spectacle lens perpendicular to the optical axis of the spectacle lens and, thus, result in a graded index (GRIN) structure of the spectacle lens. At least some of the gradients of the refractive index may extend in a non-radial direction, i.e., the GRIN structure of the spectacle lens may not be solely radial. The GRIN structure of the spectacle lens may correspond to an asymmetrical geometrical shape of the spectacle frame, in which the spectacle lens shall be inserted.

A data processing system may consist of or comprise at least one of the following items: A personal computer, a server, a tablet computer, and a smart phone. The data processing system may comprise in addition to the processor a memory for storing data. A computer readable storage medium may be provided as a hard disk drive, a flash drive, a USB drive, a CD, a DVD a Blu-ray disk, a floppy disk, or any other means suitable for storing computer readable data.

The disclosure provides the advantages that spectacle lenses having a homogeneous edge thickness may be provided, i.e., spectacle lenses having an edge thickness varying by 0.5 mm or less. In particular, such spectacle lenses having a homogeneous edge thickness may be provided without the need of a supporting rim as required for lenticular lenses. This allows using the entire area of the spectacle lenses without having an optically unusable supporting rim. In general, a homogeneous edge thickness of the spectacle lens may facilitate an edging process and/or a process for providing a bevel at the edge contour of the spectacle lens. Due to the homogeneous edge thickness a mechanical resistance for the edging process and/or a bevel forming process may be kept constant which may eliminate an angular-dependent mechanical resistance and, thus, may facilitate said processes. The bevel may be formed using an additive manufacturing process, such as described for instance in DE 10 2014 000 107 A1.

Moreover, the disclosure provides the advantage that an aesthetic appearance of the spectacle lens may be improved as the edge thickness is homogeneous throughout the entire edge contour. This may be beneficial in particular for frame-less spectacles and/or for NYLOR spectacles, as in these types of spectacles the edge contour of the inserted spectacle lenses is at least partly visible.

In addition, the disclosure provides the advantage that an overall thickness of spectacle lenses may be reduced in case where a minimum edge thickness to be maintained is the limiting factor. In conventional lenses having only the geometrical profile of the surfaces affecting the power of the spectacle lens, the thickness of the spectacle lens in the center of the spectacle lens may have to be chosen thick only for the reason that a minimum edge thickness is ensured. However, using a method according to the disclosure for generating design data for the spectacle lens including spatially varying the refractive index may allow to provide the optical power at least partly by means of a gradient of the refractive index and by this to at least partly decouple the edge thickness from the overall thickness of the spectacle lens.

Furthermore, the disclosure provides the advantage that spectacle lenses for hyperopic eyes and in particular for strongly myopic eyes may be provided with a significantly reduced edge thickness as compared to conventional spectacle lenses having a homogeneous refractive index. This may facilitate mounting such spectacle lenses into a spectacle frame and/or may improve the aesthetic appearance of such spectacle lenses.

A resulting optical power of the spectacle lens manufactured according to the generated design may be determined by the optimized geometrical profile of the at least one surface of the spectacle lens and by the spatial variation of the refractive index of the spectacle lens. Hence, the optical power of the spectacle lens may be at least partly decoupled from the geometrical profile of the spectacle lens, such as the geometrical profile of the back surface of the spectacle lens, which is typically adjusted to achieve the desired optical power. This leaves some degree of freedom regarding the geometrical profile of the spectacle lens while still ensuring the intended optical power. Possible requirements regarding a minimum edge thickness of the spectacle lenses may still be considered in the method for generating design data. For instance, the method may be configured to ensure an edge thickness of 0.6 mm or more for a spectacle lens to be designed. This may be beneficial for fixing the spectacle lens in a spectacle frame and/or for ensuring a mechanical durability of the edge of the spectacle frame.

A maximum relative variation of the refractive index according to the spatial variation is not less than 0.1 and not more than 0.5. For instance, two or more different materials having different indices of refraction may be chosen to provide a spatial variation of the refractive index of the spectacle lens. For this purpose, the two or more different materials may be applied in a spatially selective manner, for instance by using an additive manufacturing technique. The materials may be chosen to have a good miscibility with each other, which may limit the maximum achievable difference of their refractive indices. As an example, different materials having a refractive index of 1.54 and 1.64, respectively, may be chosen. The miscibility properties may be in particular relevant when generating the design data such that the spectacle lens is manufactured having graded index (GRIN) properties, at which the materials are directly mixing to a large degree in the manufacturing process. The miscibility properties may still be beneficial but less critical when the manufacturing of a lens according to design data is based on creating multiple layers of different materials, although at the interfaces of these different layers a mixing of the different materials may occur.

The geometrical information regarding the predefined spectacle frame may include asymmetrical frame contour data. This may be the case for most spectacle frames. Accordingly, the optimized spatial variation of the refractive index of the spectacle lens may be asymmetrical across the at least one surface of the spectacle lens. In particular, the asymmetric spatial variation of the refractive index of the spectacle lens may be based on and/or influenced by the asymmetric frame contour data of the spectacle frame. For spectacle lenses having a negative power a particularly small edge thickness may optionally be achieved by applying mostly a material having the lower refractive index in a central region of the spectacle lens while applying the material having the higher refractive index in the radially outer regions. For spectacle lenses having a positive power a particularly small central thickness of the spectacle lens may optionally be achieved by applying mostly a material having the higher refractive index in a central region of the spectacle lens while applying the material having the lower refractive index in the radially outer regions.

The provided prescribed power may comprise a specification regarding at least one of a spherical power, a cylindrical power, and a prismatic power and an addition power. The prescribed power may optionally comprise further information regarding an adaptation of the spectacle lens for the needs of the patient.

The geometrical information regarding the predefined spectacle frame may comprise geometrical information regarding at least one of a position of a centration point, a decentration of a visual point from a center point of the spectacle lens, a position of wear the spectacle frame, and frame contour data of the predefined spectacle frame. In general, the geometrical information may contain information regarding the required shape of the spectacle lens to be mountable in the predefined spectacle frame and/or regarding the required arrangement of the spectacle lens in the spectacle frame to meet the patient's needs. In particular, the geometrical information regarding the predefined spectacle frame may comprise centration information which may be relevant for centering the spectacle lens in the spectacle frame.

The method for generating design data for a spectacle lens may further comprise a step of optimizing the geometrical profile of at least one surface of the spectacle lens without any variation of refractive index prior to carrying out the optimization under consideration of a spatial variation of the refractive index. This first optimization may be based on the refractive index of a material being the main material of the spectacle lens. This first optimization may be carried out in an identical or similar manner as conventional optimization processes for spectacle lenses, as described for instance in US 2020/0409174 A1 or US 2021/0117588 A1. This may include specifying target values at certain points of the spectacle lens. An algorithm then may minimize the deviation of the design of the spectacle lens, in particular a back surface of a spectacle lens and optionally the front surface, from these target values by varying one or more design parameters. Hence, the spectacle lens may be first optimized in a classical manner, i.e., a constant refractive index may be used to optimize the back surface of the spectacle lens so that the optical effect of the spectacle lens matches the intended target effect as closely as possible. This optimization may include a boundary condition according to which an edge thickness and a center thickness of the spectacle lens do not fall below a predetermined minimum thickness, which may be 0.6 mm for the edge thickness.

In a second step, the optimization of the geometrical profile of at least one surface of the spectacle lens and the spatial variation of the refractive index of the spectacle lens may be carried out such that a power of the spectacle lens essentially corresponds to the prescribed power and an edge contour of the spectacle lens fitted to the geometrical information regarding the predefined spectacle frame has an edge thickness varying by 0.5 mm or less over the edge contour. In this step, the required edge contour for the predefined spectacle frame may be included in the optimization as follows: Along the edge contour of the spectacle lens, at several points (which may for instance be at least 50%, optionally about 100 points and optionally up to 1,000 points), the edge thickness of the spectacle lens is predetermined to be a constant value as a target value. In order to achieve these target values of the edge thickness while keeping the effect constant, the spatial variation of the refractive index distribution in the spectacle lens is used as a further degree of freedom. In addition, it may be advantageous to refine also the previously optimized geometrical profile of the spectacle lens, which may include in particular the back surface. This may include allowing also non-rotationally symmetric freeform surfaces. The effect and/or power of the spectacle lens may be further controlled by predetermined target values. Depending on the number of degrees of freedom of the parameterization of the geometrical profile of the spectacle lens, in particular the back surface, and the spatial distribution of the refractive index, the number of control points may be increased, at which the target effect of the spectacle lens is controlled. The effect or power of the spectacle lens may be weighted significantly higher than the intended compliance with predetermined homogenous edge thickness, in order to avoid that the homogeneous edge thickness is not achieved at the expense of a significant loss in optical power and/or effect of the spectacle lens. Furthermore, other parameters may be taken into account during the optimization process, which may concern the manufacturability of the glass. For example, the refractive index may only vary within the range of refractive indices of the materials used for manufacturing the spectacle lens and optionally a refractive index gradient may not exceed a predetermined maximum value at any point in the spectacle lens. The maximum value for the refractive index gradient may for instance be 0.05/mm, 0.02/mm or 0.01/mm. This may be beneficial for avoiding an impairment of manufacturability. Once all target values and parameters have been determined, the optimization can be carried out. In order for the procedure to be suitable for the mass process, it must be ensured that all the above steps are automated. Besides the consideration of a spatial variation of the refractive index, the optimization process may be similar to an optimization process described in US 2020/0409174 A1. Optimizing the geometrical profile of at least one surface of the spectacle lens and optimizing the spatial variation of the refractive index of the spectacle lens may be carried out in an alternating manner and/or in an iterative loop. Alternatively or addition, optimizing the geometrical profile of at least one surface of the spectacle lens and optimizing the spatial variation of the refractive index of the spectacle lens may be carried out together in one and the same step.

The method for manufacturing the spectacle lens may be based on a mixture of at least two different materials having different indices of refraction. The possible range for compensating differences in the edge thickness may depend on the difference(s) of the refractive indices of the used materials and the overall thickness of the spectacle lens. The higher the difference(s) of the refractive indices and the thicker the material of the spectacle lens, the higher the range of possible compensation of the edge thickness may be.

The method for manufacturing the spectacle lens may be carried out at least partly using an additive manufacturing technique. However, any manufacturing technique allowing applying materials of different refractive indices in a spatially controlled manner may be suitable for manufacturing a spectacle lens according to the disclosure. Optionally a drop-on-demand inkjet printer may be used for this purpose and in particular for manufacturing spectacle lenses having a non-rotational-symmetric spatial variation of the refractive index. The additive manufacturing technique may include applying multiple layers of material for manufacturing the spectacle lens. The different layers may differ in the used material and in particular in their refractive index. Not every layer has necessarily to extend over the entire area of the spectacle lens. At least some layers may cover only a part of the area of the spectacle lens which may allow providing a spatial variation of the refractive index. In each layer, one or more different materials may be included. However, according to some exemplary embodiments each individual layer may contain only one material, which may be beneficial for avoiding undesired artefacts in the resulting spectacle lens. Each layer may have a thickness between 1 μm to 100 μm and optionally between 4 μm to 100 μm. The entire spectacle lens may be manufactured in the additive manufacturing process of about 100 million to about 1 billion droplets, wherein each droplet may have a volume in the range of 30 pL to 100 pL. The additive manufacturing may be similar to processes described in the following documents: WO 2020/165439 A1, EP 3 352 001 A1, EP 3 598 213 A1, WO 2008/051592 A2, WO 2021/255337 A1, EP 3 312 661 A1, EP 3 696 578 A1, US 2005/0046957 A1, Trost et al., Proc. Ann. Mtg. ASPE, 10-15 Nov. 2001 (ASPE, Raleigh, NV 2001) pp. 533-536, and Thesis of D. Fisher "Gradient-Index Ophthalmic Lens Design and Polymer Material Studies," University of Rochester, New York, 2002.

Manufacturing the spectacle lens using an additive manufacturing technique may include applying a low refractive material having a refractive index of 1.5 or less containing at least one material selected from the group: fluorine-containing monomers, nanoparticles based on $MgF_2$, aliphatic monomers, cycloaliphatic monomers, and nanoparticles based on $SiO_2$. This material may be considered as a low refractive index material or a very low refractive index material.

Moreover, manufacturing the spectacle lens using an additive manufacturing technique includes applying a high refractive material having a refractive index higher than 1.5 containing at least one material selected from the group: aromatic compounds, halogenated compounds, Sulfur-containing compounds, metal containing compounds, nanoparticles based on polymers, nanoparticles based on metals, nanoparticles based on metal oxides, nanoparticles based on chalcogenides, and nanoparticles based on metal salts. This material may be considered as a high refractive index material.

Applying these materials in a spatial distribution, such as in different layers having a spatially varying thickness, may allow providing a spatial variation of the refractive index of the spectacle lens. Optionally, more than two different materials may be used for providing the spatial distribution of the refractive index of the spectacle lens, such as three of four different materials. The different materials may have different indices of refraction with respect to each other.

Several materials and material combinations are described in the following, which may be suitable for manufacturing a spectacle lens according to the disclosure using an additive manufacturing technique. However, the disclosure and the ability for manufacturing spectacle lenses using an additive manufacturing technique are not limited to the presented examples. Moreover, the disclosure is not limited to spectacle lenses being producible by an additive manufacturing technique.

In principle, material systems which can be applied or printed from a liquid precursor (fluid) and which, after curing or solidification, produce a stable layer with the desired optical properties (refractive index, transmission, etc.) may be usable as materials for manufacturing a spectacle lens using an additive manufacturing technique. The technique may be based on printing several layers forming the spectacle lens. In addition to purely inorganic or organic systems, the usable materials may include also organic-inorganic hybrid materials.

The curing or solidification of a printed liquid layer may be achieved by physical (e.g., drying, solidification) and/or chemical processes (e.g., polymerization, condensation). Optionally radiation curing may be used and in particular UV curing. In an exemplary embodiment, LED UV curing may be used.

Material systems based on (meth)acrylates, epoxy compounds, urethanes, thiol-ene systems and/or silicones as well as hybrid systems may be used. Di- and trifunctional components may be used. Moreover, mono- and multifunctional monomers and oligomers may be used.

In the above-mentioned material systems, the refractive index may be adjusted by using reactive or non-reactive components and nanoscale fillers for realizing material systems having different refractive indices:

(i) Very low refractive indices (refractive index smaller than 1.50): fluorine-containing monomers and nanoparticles (e.g., $MgF_2$).

(ii) low refractive indices (refractive index ca. 1.50): aliphatic and cycloaliphatic monomers as well as typical nanoparticles based on $SiO_2$.

(iii) high refractive indexes (refractive index higher than 1.50): aromatic, halogenated, sulfur-containing or metal-containing compounds, nanoparticles based on polymers, metals, metal oxides, chalcogenides and metal salts.

Solvent-free formulations (fluids) may be used with reactive thinners (e.g., VEAA, BDMA, 2G), which may be firmly incorporated into the network.

Furthermore, a variety of additives may be used to adjust the fluid or layer properties, for example photoinitiators (e.g., TPO, TPO-L, MBF), UV absorbers (Tinuvin 329, Uvinul 3049), light stabilizers (e.g., HALS Tinuvin 292), dyes/pigments, flow aids and/or wetting aids (e.g., from BYK).

Optionally the basic chemistry of the fluids used may be matched to each other, for example, to improve an adhesion between the different layers of different materials. The materials of different layers which shall adhere to each other may each be acrylates or epoxies, for example. However, to ensure good adhesion between the different layers a combination of materials from different material classes may be avoided.

An additive manufacturing technique may use or be based on inkjet printing. For this purpose, fluids may have the following properties, which may be based on the requirements of the printheads:

(i) Viscosity: approx. 5 to 100 mPas, and optionally 6 to 20 mPas.

(ii) Surface tension: approx. 30 to 40 mN/m.

Since at least two fluids with different refractive indices are used, this results in significantly different fluid compositions with correspondingly varying material properties. The difference in refractive indices may be maximized while taking into account the other properties, because the greater the difference in refractive indices, the greater optical effects can be achieved. The effect of the difference also depends on the lateral expansion of the lenses. For an MPA lens to achieve a significant advantage over a conventionally manufactured lens, a refractive index difference of approximately 0.05 is required. This minimum difference of 0.05 in refractive index may result in a material selection of aliphatic and cycloaliphatic monomers when concentrating on organic substances for the low-refractive material.

Higher-refractive components, such as UV absorbers, may only be used in small quantities. The high-index fluid, on the other hand, must be composed essentially of high-index monomers. Aromatic and sulfur-containing monomers are mainly used here. Since these often have a high viscosity as such, reactive diluents may be required.

Various examples of transparent monomer mixtures with low refractive index (~1.5) can be found at Stratasys (U.S. Pat. No. 6,569,373 B2, US 2022/0134640 A1, WO 2022/085006 A1).

Formulation I from US 2022/0134640 A1 is cited in the following as an example:

TABLE 1

| LI Fluid composition according to US 2022/0134640 A1 | |
|---|---|
| Component | Weight % |
| Monofunctional meth(acrylate) | 40-60 |
| Difunctional aliphatic urethane acrylate | 3-8 |
| Polyfunctional aliphatic urethane acrylate | 12-22 |
| Ethoxylated aromatic di(meth)acrylate | 15-25 |
| Ethoxylated aliphatic di(meth)acrylate | 5-10 |
| Photoinitiator TPO or TPO-L | 0.1-1 |
| Stabilizers (MEHQ and similar) | 0.1-0.2 |
| Surfactants (e.g., BYK) | 0.01-0.05 |
| Blue pigment (for setting YI) | $0.1 \times 10-4$ |

Highly refractive materials are described in WO 2020/0131786 A1, EP 1 409 562 B1, and U.S. Pat. No. 10,976,573 B2, among others. The example formulations 3 and 6 from WO 2020/0131786 A1 can be used as typical representatives.

It is understood by a person skilled in the art that the above-described features and the features in the following description and drawings are not only disclosed in the explicitly disclosed exemplary embodiments and combinations, but that also other technically feasible combinations as well as the isolated features are comprised by the disclosure. In the following, several exemplary embodiments and specific examples are described with reference to the drawings for illustrating the disclosure without limiting the disclosure to the described exemplary embodiments.

BRIEF DESCRIPTION OF THE DRAWINGS

Further exemplary embodiments will be illustrated in the following with reference to the drawings, wherein:

FIGS. 4A to 4D show a visualization of some characteristics of design data for a spectacle lens according to an exemplary embodiment in respective maps;

FIGS. 5A to 5D show the maps corresponding to FIGS. 4A to 4D for a spectacle lens of the exemplary embodiment shown in FIG. 1A;

Figure 1A:
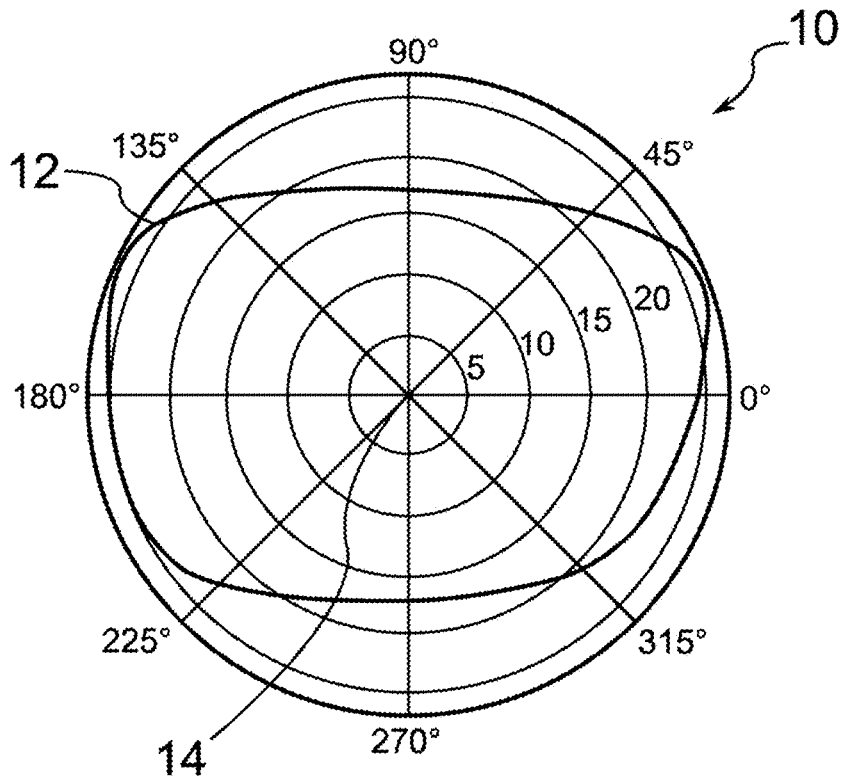
FIGS. 1A and 1B schematically show a spectacle lens 10 according to an exemplary embodiment of the disclosure.

In the drawings the same reference signs are used for corresponding or similar features in different drawings.

DESCRIPTION OF EXEMPLARY EMBODIMENTS

Figure 1B:
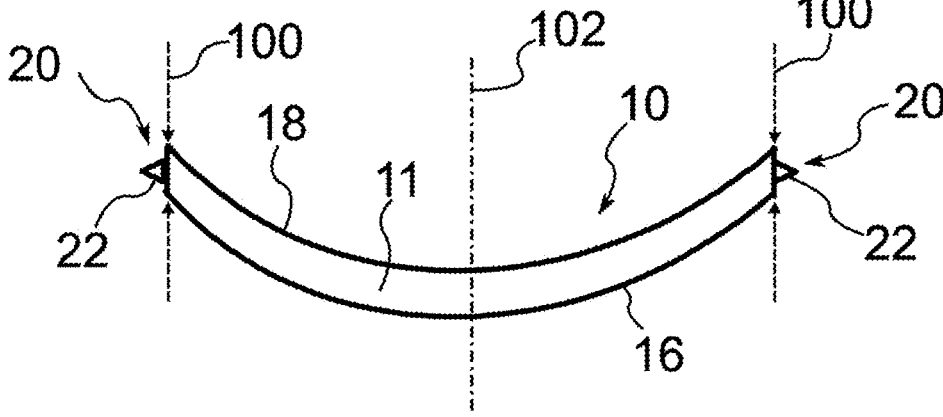

FIGS. 1A and 1B schematically illustrate a spectacle lens 10 according to an exemplary embodiment of the disclosure. FIG. 1A depicts the spectacle lens 10 in top view together with an angular graph indicating the radial extension of the spectacle lens 10 depending on the angle. The concentric lines indicate the radial extension from 0 mm to 25 mm at angles from 0° to 360°. The spectacle lens 10 is indicated by a two-dimensional projection of its edge contour 12. The origin of the angular graph may be regarded as a center point 14 of the spectacle lens 10. The shape of the edge contour 12 of the spectacle lens 10 may be determined by an predefined spectacle frame into which the spectacle lens 10 shall be mounted. The spectacle frame may have a frame with a shape corresponding to the edge contour 12 of the spectacle lens allowing to mount the spectacle lens 10 therein.

FIG. 1B exemplarily illustrates the spectacle lens 10 in a cross-sectional side view, which shows the lens body 11 having a front surface 16 and a back surface 18. Typically, the back surface 18 faces the patient's eye when the spectacles are worn by the patient and the front surface 16 are facing away from the patient's eye. For optimizing the optical power of the spectacle lens 10 the back surface 18 may be primarily optimized and modified while the front surface 16 may be kept constant, although according to some exemplary embodiments also the front surface 16 may be altered during the optimization.

According to the exemplary embodiment the spectacle lens 10 has a homogeneous edge thickness 100, which is indicated by dashed arrows, i.e., an edge thickness varying 0.5 mm or less over the edge contour 12 of the spectacle lens 10. This means, that for each angle the spectacle lens 10 has essentially the same thickness although the radial extension of the spectacle lens 10 may vary significantly at different angles, as shown in FIG. 1A. This may be achieved by using design data generated in a method which will be explained further below with reference to FIG. 2. The edge contour 12 is the surface delimiting the lens body 11 at the side surface of the lens body 11 connecting the front surface 16 and the back surface 18 at the outermost radial end of the spectacle lens 10. It is to be noted that the spectacle lens 10 may further comprise a bevel 22 provided at the edge contour 12, which may be applied for inserting into a respective groove in the spectacle frame when mounting the spectacle lens 10 into the spectacle frame. The bevel 22 shall not be considered when determining the edge thickness 100 of the spectacle lens 10. Instead, the edge thickness 100 may be determined only by the extension of the lens body 11 at the edge of the spectacle lens 10 parallel to the optical axis 102 of the spectacle lens 10. Likewise, for spectacle lenses optionally having a groove, such as a NYLOR groove, extending along the edge surface in addition to or instead of the bevel 22, the edge thickness 100 of the spectacle lens 10 may be determined without considering the groove.

Figure 2:
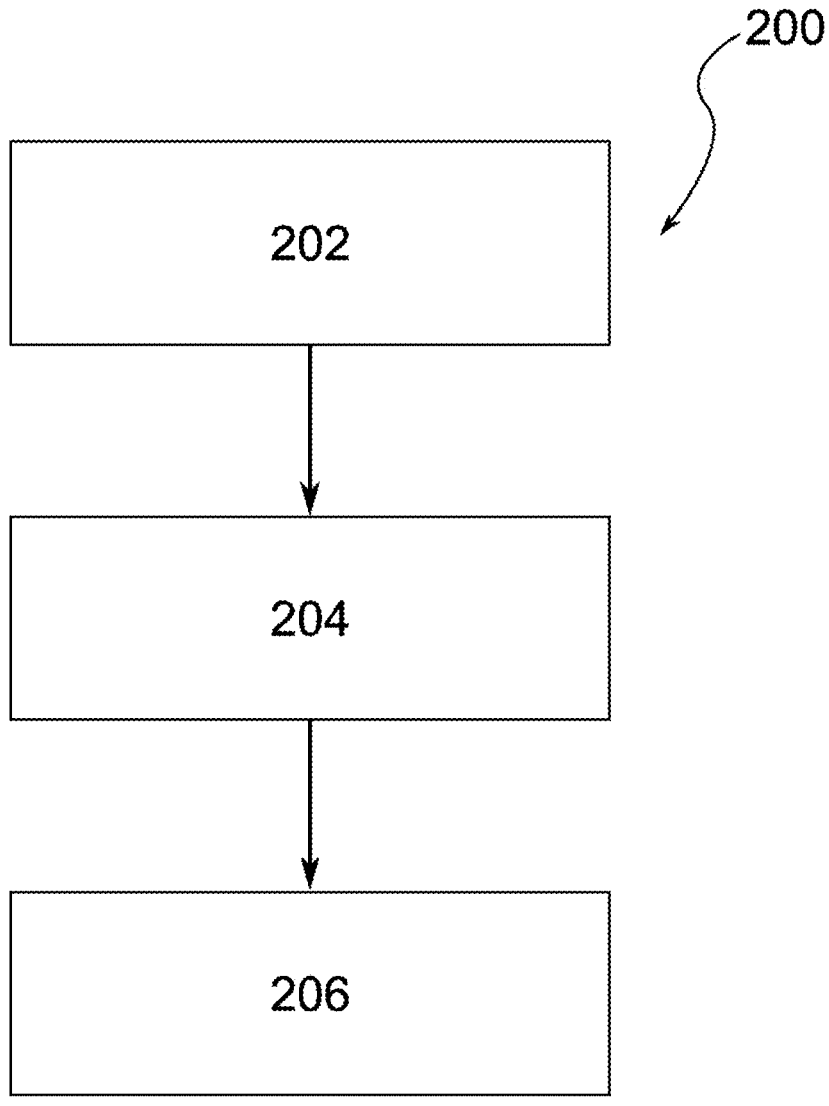
FIG. 2 shows a method for generating design data for a spectacle lens.

In the following a method 200 for generating design data for a spectacle lens 10 suitable for the purpose of a use of the design data for manufacturing the spectacle lens 10 having a prescribed power and an edge contour 12 fitted to an predefined spectacle frame is described with reference to FIG. 2.

The method 200 comprises in a step 202 providing prescription information regarding the prescribed power for the spectacle lens 10 and geometrical information regarding the predefined spectacle frame. The provided prescribed power may comprise a specification regarding at least one of a spherical power, a cylindrical power, and a prismatic power and an addition power. The provided geometrical information regarding the predefined spectacle frame may comprise information regarding at least one of a position of a centration point at the spectacle lens 10, a decentration of a visual point from a center point 14 of the spectacle lens 10, an intended orientation of the spectacle lens 10 in the spectacle frame, and a frame contour data of the predefined spectacle frame.

The method 200 further comprises in a step 204 optimizing a geometrical profile of at least one surface of the spectacle lens 10, i.e., the front surface 16 and/or the back surface 18, and a spatial variation of the refractive index of the spectacle lens 10 such that a power of the spectacle lens 10 essentially corresponds to the prescribed power and an edge contour 12 of the spectacle lens 10 fitted to the geometrical information regarding the predefined spectacle frame has an edge thickness 100 varying by 0.5 mm or less over the edge contour 12.

A resulting optical power of the spectacle lens 10 manufactured according to the generated design is determined by the optimized geometrical profile of the back surface 18 and optionally of the front surface 16 of the spectacle lens 10 and partly by the spatial variation of the refractive index of the spectacle lens 10, i.e., of the material of the lens body 11 of the spectacle lens 10. A maximum relative variation of the refractive index according to the spatial variation is not less than 0.01, optionally not less than 0.1 and optionally not more than 0.5.

The geometrical information regarding the predefined spectacle frame may include an asymmetrical frame contour data and the spatial variation of the refractive index of the spectacle lens 10 optimized in step 204 may be asymmetrical across the lens body 11 in a cross section of the spectacle lens 10 perpendicular to the optical axis 102 of the spectacle lens 10.

The method 200 may be extended to a method for manufacturing a spectacle lens 10 by adding a method step 206 of manufacturing the spectacle lens 10 according to the design data. The manufacturing may use an additive manufacturing technique, such as drop-on-demand inkjet printing. Moreover, the manufacturing step 206 may comprise printing multiple layers of different materials having different refractive indices to build up the lens body 11 of the spectacle lens 10.

Figure 3:
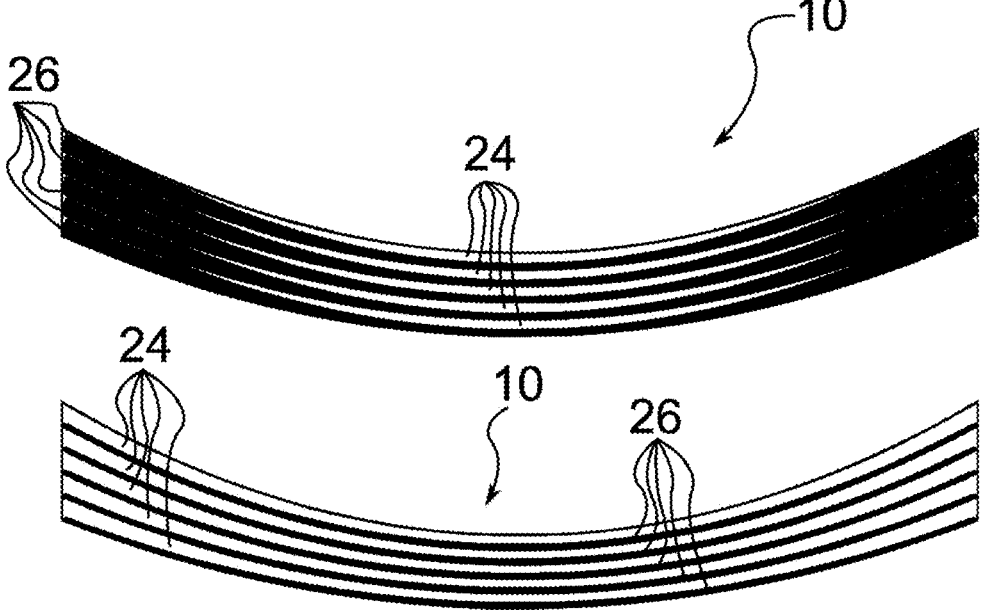
FIG. 3 shows a horizontal cut (upper part) and a vertical cut (lower part) through a spectacle lens according to an exemplary embodiment.

FIG. 3 schematically shows a horizontal cut (upper FIG.) and a vertical cut (lower FIG.) through a spectacle lens 10 according to an exemplary embodiment, wherein the spectacle lens 10 is formed by multiple layers of two different materials. The bright areas represent layers 24 of the material having the lower refractive index, such as a refractive index of 1.54. The darker areas represent the layers 26 of material having a higher refractive index, such as 1.64. It is to be noted that the layers do not have a homogeneous thickness over the entire area and differ also regarding their thickness among each other. This ensures that a spatial variation of the overall refractive index in a direction parallel to the optical axis 102 can be achieved.

Figures 4C, 4D:
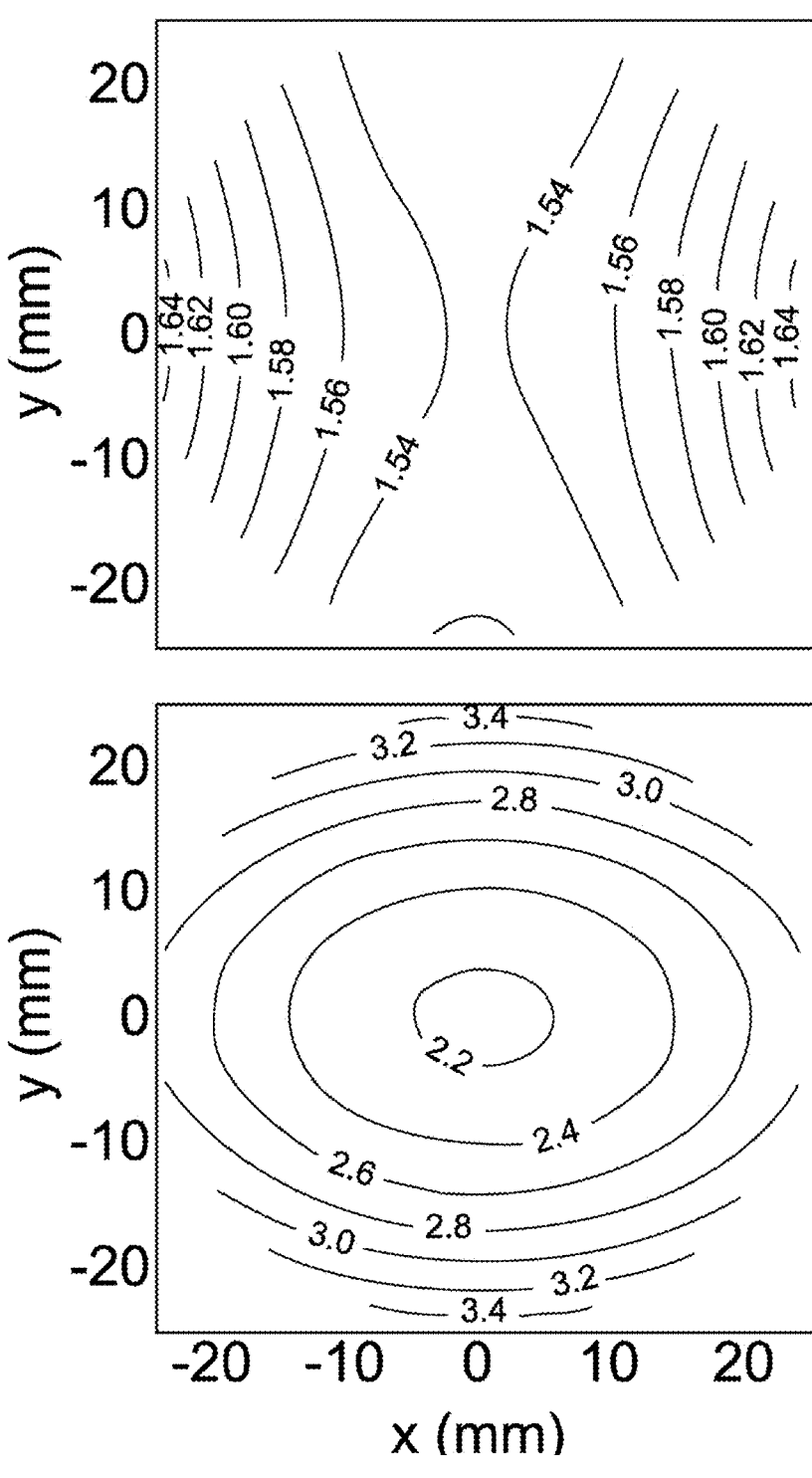

FIGS. 4A to 4D schematically visualize some characteristics of design data for a spectacle lens 10 according to an exemplary embodiment in respective maps. The design data is for the purpose of using the design data to manufacture a single vision spectacle lens 10 having a spherical optical power of −2.0 D and an oval edge contour 12. In each map the horizontal axis represents an x-direction of the plane perpendicular to the optical axis of the spectacle lens 10 and the vertical axis represents a y-direction in the same plane. FIG. 4A shows the spatial distribution map of the optical power in diopters, wherein the lines indicate profiles having the same optical power indicated in the map. As can be seen, the lines of equal optical power deviate from circular lines and are prone towards an elliptical shape originating in the oval edge contour 12 predetermined by the predefined spectacle frame. Likewise, FIG. 4B depicts a spatial distribution of the cylindrical power according to the optimized design data, wherein the values are well below 0.1D. FIG. 4C shows the spatial variation, i.e., the optimized spatial distribution of the refractive index according to the design data, wherein the lines indicate an equal refractive index such that the gradient of the refractive index is zero along these lines. The respective values of the refractive indices are indicated in the map and are in a range from 1.54 to 1.64, which are the respective refractive indices of the neat materials used for the manufacturing process. As can be seen, the spatial distribution of the refractive index exhibits gradients in the y-direction radially outwards, such that the refractive index has its minimum in the center and increases radially outwards in y-direction. This allows achieving spectacle lenses having the desired edge contour 12 fitting into the oval spectacle frame and having a homogeneous edge thickness 100. FIG. 4D indicates the thickness of the spectacle lens 10, wherein the lines indicate equal thickness. As can be seen, although the spectacle lens 10 has an oval edge contour 12, the thickness follows the oval profile and offers a homogeneous edge thickness 100 at the edge of the spectacle lens 10, i.e., an edge thickness varying by 0.5 mm or less over the edge contour 12 of the spectacle lens 10.

FIGS. 5A to 5D depict the maps corresponding to FIGS. 4A to 4D for a spectacle lens 10 of the exemplary embodiment shown in FIG. 1A, i.e., the maps of the spherical power (FIG. 5A), the cylindrical power (FIG. 5B), the refractive index (FIG. 5C) and the thickness of the spectacle lens 10 (FIG. 5D). The spectacle lens 10 shown in FIG. 1A has a flattened edge contour 12 having a larger radius at the angles of 0° and 180° than at 90° and 270°. The edge contour 12 shown in FIG. 1A may be determined by a mechanical tracer. Again, the spectacle lens 10 shall be designed as a single vision lens having an optical power of −2.0 D. As can be seen, the lines of equal optical power deviate strongly from circular concentric lines and again the cylindrical power is negligible. The refractive index (FIG. 5C) shows a significant radially outward directed gradient in y-direction and the thickness of the spectacle lens 10 (FIG. 5D) closely reproduces the intended edge contour 12 of the spectacle lens 10 resulting in an edge thickness 100 varying by 0.5 mm or less over the edge contour 12.

Figure 5E:
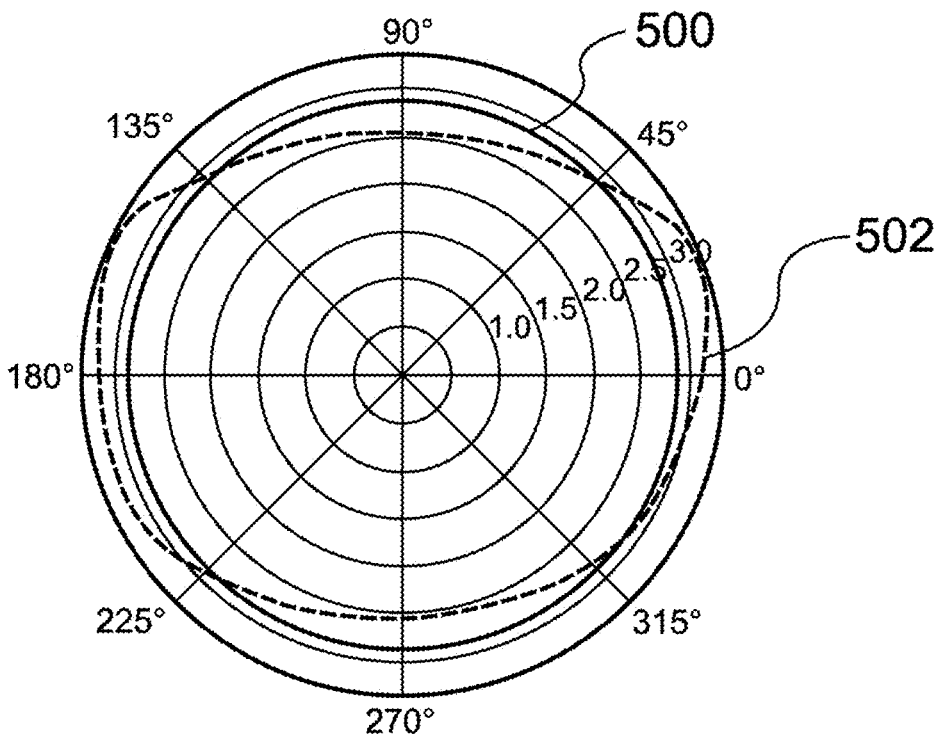
FIG. 5E shows in an angular diagram the resulting edge thicknesses achieved.

FIG. 5E depicts in an angular diagram the resulting edge thicknesses 100 achieved with a design according to FIGS. 5A to 5D (solid line 500) compared to a design having the same edge contour 12 but realized without a spatial variation of the refractive index (dashed line 502). The design according to the disclosure of FIGS. 5A to 5D based on the GRIN design offers a homogeneous edge thickness 100 of about 2.9 mm at the entire 360° of the edge contour 12. In contrast, the conventional spectacle lens without GRIN has a strongly inhomogeneous edge thickness varying in a range from about 2.5 mm to 3.5 mm. This demonstrates the potential of providing spectacle lenses having a homogeneous edge thickness throughout the entire edge contour 12.

Figure 6:
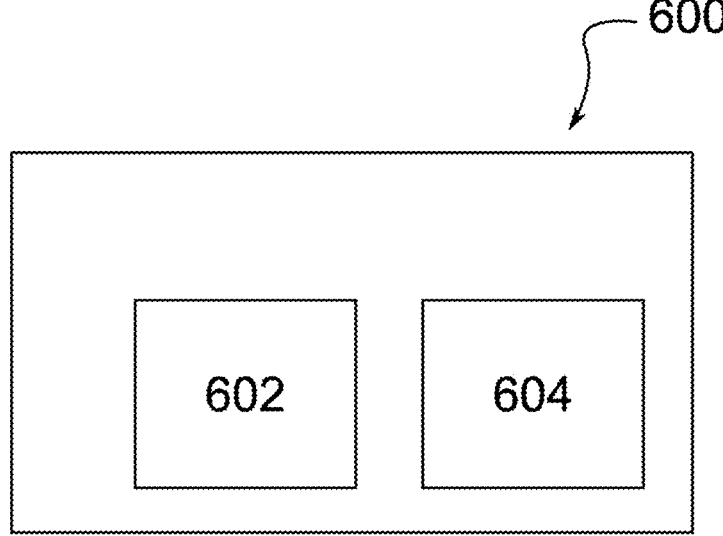
FIG. 6 shows a data processing system according to an exemplary embodiment.

FIG. 6 schematically depicts a data processing system 600 comprising a processor 602 and a memory unit 604 configured to generate design data of a spectacle lens 10 suitable for the purpose of a use of the design for manufacturing the spectacle lens 10 having a prescribed power and a geometrical shape fitted to an predefined spectacle frame. Generating the design data may comprise providing prescription information regarding the prescribed power for the spectacle lens 10 and geometrical information regarding the predefined spectacle frame. Moreover, generating the design data may comprise optimizing a geometrical profile of at least one surface of the spectacle lens 10 and a spatial variation of the refractive index of the spectacle lens 10 such that a power of the spectacle lens 10 essentially corresponds to the prescribed power and an edge contour 12 of the spectacle lens 10 fitted to the geometrical information regarding the predefined spectacle frame has an edge thickness 100 varying by 0.5 mm or less over the edge contour 12 of the spectacle lens 10.

CLAUSES

Clause 1. Computer-implemented method 200 for generating design data for a spectacle lens 10 suitable for the purpose of a use of the design data for manufacturing the spectacle lens 10 having a prescribed power and an edge contour 12 fitted to a predefined spectacle frame, the method comprising:

providing 202 prescription information regarding the prescribed power for the spectacle lens 10 and geometrical information regarding the predefined spectacle frame;

optimizing 204 a geometrical profile of at least one surface of the spectacle lens 10 and a spatial variation of a refractive index of the spectacle lens 10 wherein the method 200 further includes optimizing a spatial variation of a refractive index of the spectacle lens 10;

wherein the optimizing 204 the geometrical profile of at least one surface of the spectacle lens 10 and the optimizing the spatial variation of the refractive index of the spectacle lens 10 are carried out such that an optical power of the spectacle lens corresponds to the prescribed power and an edge thickness of an edge contour 12 of the spectacle lens 10 fitted to the geometrical information regarding the predefined spectacle frame varies by 0.5 mm or less over the edge contour 12.

Clause 2. Method 200 according to clause 1, wherein a resulting optical power of the spectacle lens 10 manufactured according to the generated design is determined by the optimized geometrical profile of the at least one surface 16, 18 of the spectacle lens 10 and by the spatial variation of the refractive index of the spectacle lens 10.

Clause 3. Method 200 according to clause 1 or 2, wherein a maximum relative variation of the refractive index according to the spatial variation of the refractive index of the spectacle lens is at least 0.1 and 0.5 or less.

Clause 4. Method 200 according to any one of the preceding clauses, wherein the geometrical information regarding the predefined spectacle frame includes asymmetrical frame contour data and wherein the optimized spatial variation of the refractive index of the spectacle lens 10 is asymmetrical across the at least one surface 16, 18 of the spectacle lens 10.

Clause 5. Method 200 according to any one of the preceding clauses, wherein the geometrical information regarding the predefined spectacle frame comprises geometrical information regarding at least one of a position of a centration point, a decentration of the spectacle lens 10, a position of wear of the spectacle frame, a frame contour data of the predefined spectacle frame.

Clause 6. Method 200 for manufacturing a spectacle lens 10 comprising providing a design data for the spectacle lens 10 generated according to a method of any one of the preceding clauses and manufacturing the spectacle lens 10 according to the generated design data.

Clause 7. Method according to clause 6, wherein manufacturing the spectacle lens 10 is carried out at least partly using an additive manufacturing technique.

Clause 8. Method according to clause 7, wherein manufacturing the spectacle lens using an additive manufacturing technique includes applying a low refractive material having a refractive index of 1.5 or less containing at least one material selected from the group: fluorine-containing monomers, nanoparticles based on $MgF_2$, aliphatic monomers, cycloaliphatic monomers, and nanoparticles based on $SiO_2$; and wherein manufacturing the spectacle lens using an additive manufacturing technique includes applying a high refractive material having a refractive index higher than 1.5 containing at least one material selected from the group: aromatic compounds, halogenated compounds, Sulfur-containing compounds, metal containing compounds, nanoparticles based on polymers, nanoparticles based on metals, nanoparticles based on metal oxides, nanoparticles based on chalcogenides, and nanoparticles based on metal salts.

Clause 9. Spectacle lens 10 having a prescribed power and an edge contour 12 fitted to an predefined spectacle frame, wherein the spectacle lens 10 has a locally varying refractive index and a geometrical profile of at least one surface 16, 18 of the spectacle lens 10 resulting in a power of the spectacle lens 10 essentially corresponding to the prescribed power and an edge thickness of an edge contour 12 of the spectacle lens 10 fitted to the geometrical information regarding the predefined spectacle frame varies by 0.5 mm or less over the edge contour 12.

Clause 10. Data set in the form of a computer-readable data signal comprising at least one kind of the following kinds of data:

i a numerical representation of the spectacle lens 10 according to clause 9 configured to be fed to one or more manufacturing machines for manufacturing the spectacle lens 10;

ii data containing computer-readable instructions for controlling one or more manufacturing machines to manufacture the spectacle lens 10 according to clause 9.

Clause 11. Data set according to clause 10, wherein the one or more manufacturing machines include a machine for carrying out an additive manufacturing process.

Clause 12. Computer program comprising instructions which, when the program is executed by a computer, cause the computer to carry out the method of any one of clauses 1 to 8.

Clause 13. Computer-readable storage medium having stored thereon the computer program of clause 12.

Clause 14. Data signal carrying the computer program of clause 12.

Clause 15. Data processing system 600 comprising a processor 602 configured to generate design data of a spectacle lens 10 suitable for the purpose of a use of the design data for manufacturing the spectacle lens 10 having a prescribed power and an edge contour 12 fitted to a predefined spectacle frame, wherein generating the design data comprises:

providing 202 prescription information regarding the prescribed power for the spectacle lens 10 and geometrical information regarding the predefined spectacle frame;

optimizing 204 a geometrical profile of at least one surface 16, 18 of the spectacle lens 10 and a spatial variation of a refractive index of the spectacle lens 10;

wherein generating the design data further comprises optimizing a spatial variation of a refractive index of the spectacle lens 10;

wherein the optimizing 204 the geometrical profile of at least one surface of the spectacle lens 10 and the optimizing the spatial variation of the refractive index of the spectacle lens 10 are carried out such that an optical power of the spectacle lens corresponds to the prescribed power and an edge thickness of an edge contour 12 of the spectacle lens 10 fitted to the geometrical information regarding the predefined spectacle frame varies by 0.5 mm or less over the edge contour 12.

The foregoing description of the exemplary embodiments of the disclosure illustrates and describes the present invention. Additionally, the disclosure shows and describes only the exemplary embodiments but, as mentioned above, it is to be understood that the disclosure is capable of use in various other combinations, modifications, and environments and is capable of changes or modifications within the scope of the concept as expressed herein, commensurate with the above teachings and/or the skill or knowledge of the relevant art.

The term "comprising" (and its grammatical variations) as used herein is used in the inclusive sense of "having" or "including" and not in the exclusive sense of consisting only of. The terms "a" and "the" as used herein are understood to encompass the plural as well as the singular.

All publications, patents and patent applications cited in this specification are herein incorporated by reference, and for any and all purposes, as if each individual publication, patent or patent application were specifically and individually indicated to be incorporated by reference. In the case of inconsistencies, the present disclosure will prevail.

LIST OF REFERENCE SIGNS 10 spectacle lens
11 lens body
12 edge contour
14 center point
16 front surface
18 back surface
22 bevel
24 layers having a low refractive index
26 layers having a high refractive index
100 edge thickness
102 optical axis of spectacle lens
200 method for generating design data
202-206 method steps
500 graph indicating edge thickness of GRIN spectacle lens
502 graph indicating edge thickness of conventional spectacle lens
600 data processing system
602 processor
604 memory unit

25

26

The invention claimed is:

1. A computer-implemented method for generating design data for a single vision spectacle lens suitable for the purpose of a use of the design data for manufacturing the spectacle lens having a prescribed power and an edge contour fitted to a predefined spectacle frame, the method comprising:

providing prescription information regarding the prescribed power for the spectacle lens and geometrical information regarding the predefined spectacle frame; and optimizing a geometrical profile of at least one surface of the spectacle lens; and optimizing a spatial variation of a refractive index of the spectacle lens, wherein optimizing the geometrical profile of at least one surface of the spectacle lens and optimizing the spatial variation of the refractive index of the spectacle lens are carried out such that an optical power of the spectacle lens corresponds to the prescribed power and an edge thickness of the edge contour of the spectacle lens fitted to the geometrical information regarding the predefined spectacle frame varies by 0.5 mm or less over the edge contour, and wherein optimizing the geometrical profile of the at least one surface of the spectacle lens changes a curvature of the at least one surface.

2. The method according to claim 1, wherein a resulting optical power of the spectacle lens manufactured according to the generated design is determined by the optimized geometrical profile of the at least one surface of the spectacle lens and by the spatial variation of the refractive index of the spectacle lens.

3. The method according to claim 1, wherein a maximum relative variation of the refractive index according to the spatial variation of the refractive index of the spectacle lens is at least 0.1 and 0.5 or less.

4. The method according to claim 1, wherein the geometrical information regarding the predefined spectacle frame includes asymmetrical frame contour data, and wherein the optimized spatial variation of the refractive index of the spectacle lens is asymmetrical across the at least one surface of the spectacle lens.

5. The method according to claim 1, wherein the geometrical information regarding the predefined spectacle frame comprises geometrical information regarding at least one of a position of a centration point, a decentration of the spectacle lens, a position of wear of the spectacle frame, and frame contour data of the predefined spectacle frame.

6. A method for manufacturing a spectacle lens comprising:

providing design data for the spectacle lens generated according to the method of claim 1 and manufacturing the spectacle lens according to the generated design data.

7. The method according to claim 6, wherein manufacturing the spectacle lens is carried out at least partly using an additive manufacturing technique.

8. The method according to claim 7, wherein manufacturing the spectacle lens using the additive manufacturing technique includes applying a low refractive material having a refractive index of 1.5 or less containing at least one material selected from the group of: fluorine-containing monomers, nanoparticles based on $MgF_2$, aliphatic monomers, cycloaliphatic monomers, and nanoparticles based on $SiO_2$; and wherein manufacturing the spectacle lens using the additive manufacturing technique includes applying a high refractive material having a refractive index higher than 1.5 containing at least one material selected from the group of: aromatic compounds, halogenated compounds, sulfur-containing compounds, metal containing compounds, nanoparticles based on polymers, nanoparticles based on metals, nanoparticles based on metal oxides, nanoparticles based on chalcogenides, and nanoparticles based on metal salts.

9. A spectacle lens having a prescribed power and an edge contour fitted to a predefined spectacle frame, wherein the spectacle lens is a single vision lens and has a locally varying refractive index and a geometrical profile of at least one surface of the spectacle lens resulting in a power of the spectacle lens essentially corresponding to the prescribed power and an edge thickness of an edge contour of the spectacle lens fitted to the geometrical information regarding the predefined spectacle frame varies by 0.5 mm or less over the edge contour, wherein the locally varying refractive index results in one or more gradients of the refractive index across the spectacle lens perpendicular to an optical axis of the spectacle lens, and wherein at least some of the gradients of the refractive index extend in a non-radial direction of the spectacle lens.

10. A data set in a form of a computer-readable data signal comprising at least one kind of the following kinds of data:

(i) a numerical representation of the spectacle lens according to claim 9 configured to be fed to one or more manufacturing machines for manufacturing the spectacle lens;

(ii) data containing computer-readable instructions for controlling one or more manufacturing machines to manufacture the spectacle lens according to claim 9.

11. The data set according to claim 10, wherein the one or more manufacturing machines include a machine for carrying out an additive manufacturing process.

12. A computer program comprising instructions which, when the program is executed by a computer, cause the computer to carry out the method of claim 1.

13. A computer program comprising instructions which, when the program is executed by a computer of one or more manufacturing machines, cause the one or more manufacturing machines to carry out the method of claim 6.

14. A computer-readable storage medium having stored thereon the computer program of claim 12.

15. A data signal carrying the computer program of claim 12.

16. A data processing system comprising a processor configured to generate design data of a single vision spectacle lens suitable for the purpose of a use of the design data for manufacturing the spectacle lens having a prescribed power and an edge contour fitted to a predefined spectacle frame, wherein generating the design data comprises:

providing prescription information regarding the prescribed power for the spectacle lens and geometrical information regarding the predefined spectacle frame;

optimizing a geometrical profile of at least one surface of the spectacle lens; and optimizing a spatial variation of a refractive index of the spectacle lens, wherein optimizing the geometrical profile of at least one surface of the spectacle lens and optimizing the spatial variation of the refractive index of the spectacle lens are carried out such that an optical power of the spectacle lens corresponds to the prescribed power and an edge thickness of the edge contour of the spectacle lens fitted to the geometrical information regarding the predefined spectacle frame varies by 0.5 mm or less over the edge contour, and wherein optimizing the geometrical profile of the at least one surface of the spectacle lens changes a curvature of the at least one surface.

17. A spectacle lens having a prescribed power and an edge contour fitted to a predefined spectacle frame, wherein the spectacle lens is a single vision lens and a geometrical profile of at least one surface of the spectacle lens resulting in a power of the spectacle lens essentially corresponding to the prescribed power and an edge thickness of an edge contour of the spectacle lens fitted to the geometrical information regarding the predefined spectacle frame varies by 0.5 mm or less over the edge contour, wherein the spectacle lens has a locally varying refractive index; and the locally varying refractive index is provided by two or more different materials having different indices of refraction applied in different layers having a spatially varying thickness using an additive manufacturing technique, the two or more different materials containing:

a low refractive material having a refractive index of 1.5 or less containing at least one material selected from the group: fluorine-containing monomers, nanoparticles based on $MgF_2$, aliphatic monomers, cycloaliphatic monomers, and nanoparticles based on $SiO_2$; and a high refractive material having a refractive index higher than 1.5 containing at least one material selected from the group of: aromatic compounds, halogenated compounds, sulfur-containing compounds, metal containing compounds, nanoparticles based on polymers, nanoparticles based on metals, nanoparticles based on metal oxides, nanoparticles based on chalcogenides, and nanoparticles based on metal salts.

* * * * *